United States Patent
Fukatsu et al.

(10) Patent No.: US 7,162,792 B2
(45) Date of Patent: Jan. 16, 2007

(54) DEVICE FOR MANUFACTURING MOTOR

(75) Inventors: Shinichi Fukatsu, Anjo (JP); Keisuke Sugiura, Anjo (JP); Mitsuo Suenaga, Anjo (JP)

(73) Assignee: Makita Corporation, Aichen-ken (JP)

( * ) Notice: Subject to any disclaimer, the term of this patent is extended or adjusted under 35 U.S.C. 154(b) by 122 days.

(21) Appl. No.: 10/983,967

(22) Filed: Nov. 8, 2004

(65) Prior Publication Data

US 2005/0125988 A1 Jun. 16, 2005

(30) Foreign Application Priority Data

Nov. 10, 2003 (JP) ............................. 2003-380556

(51) Int. Cl.
*B23P 19/00* (2006.01)
*H02K 15/00* (2006.01)

(52) U.S. Cl. ........................... 29/732; 29/729; 29/733; 29/735; 29/596; 29/598; 310/42

(58) Field of Classification Search .......... 29/596–598, 29/732–736, 469, 281.1; 310/42; 140/92.1, 140/93 R; 242/441
See application file for complete search history.

(56) References Cited

U.S. PATENT DOCUMENTS 3,990,141 A * 11/1976 Stark ............................ 29/596
4,176,444 A    12/1979 Walker
5,062,200 A * 11/1991 Lanfranco .................... 29/732
6,122,817 A *  9/2000 Meacham et al. ............ 29/598
6,739,034 B1 *  5/2004 Suzuki et al. ................ 29/732
6,807,724 B1 * 10/2004 Yasuda et al. ............... 29/732

FOREIGN PATENT DOCUMENTS

| EP | 0871282    | 10/1998 |     |
|----|-----------|---------|-----|
| GB | 2159078 A | 11/1985 | *   |
| JP | 59-6140   |  2/1984 |     |
| JP | 2000-014098 | 1/2000 |     |

OTHER PUBLICATIONS

European Search Report; Sep. 5, 2005.

* cited by examiner

*Primary Examiner*—Minh Trinh
(74) *Attorney, Agent, or Firm*—Orrick, Herrington & Sutcliffe LLP

(57) ABSTRACT

A device for manufacturing a motor is disclosed. The motors to be manufactured have a stator body including a stator of the motor, field cores that protrude from the inside surface of the stator body, pole pieces that extend from the field cores to cross with the field cores, coil receiving parts defined by a space facing the field cores, the pole pieces and the inside surface of the stator body, and coils retained in the coil receiving parts. The device has first jigs that extend in the longitudinal direction of the stator body and retain the pole pieces as well as a second jig that extends in the longitudinal direction of the stator body. The second jig has a pressing part corresponding to the arcuate shape of the pole pieces. The device further includes a pressing mechanism that presses the first jigs retaining the pole pieces away from the coil receiving parts, thereby bending the pole pieces away from the coil receiving parts.

3 Claims, 23 Drawing Sheets

(A)

(B)

(A)

(B)

(A)
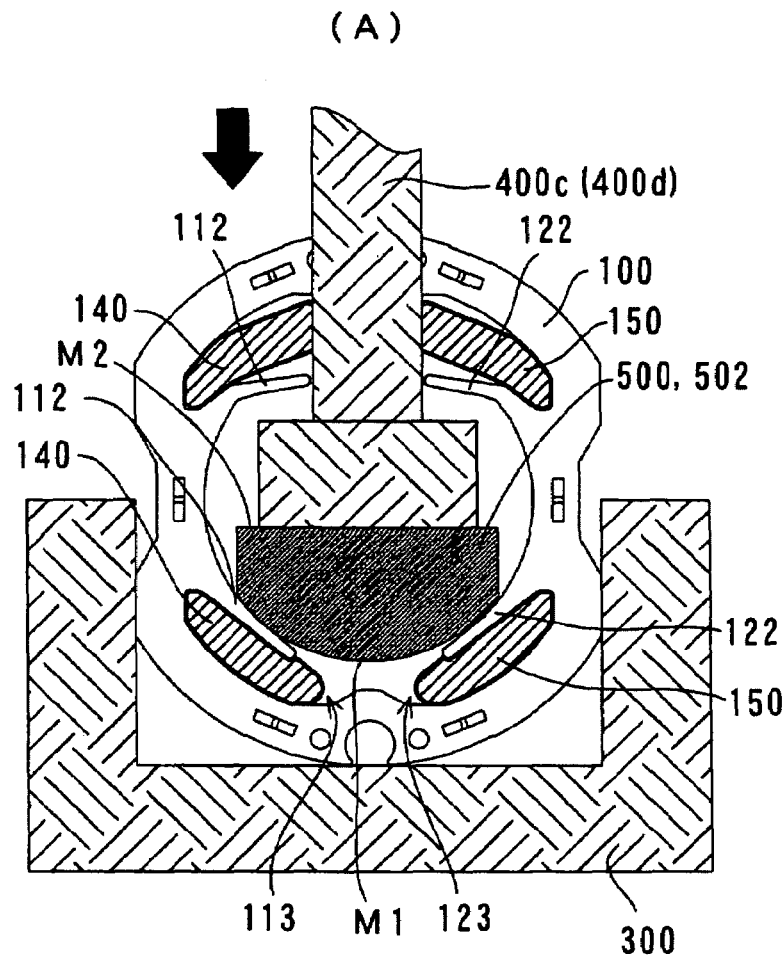
FIG. 12
(B)
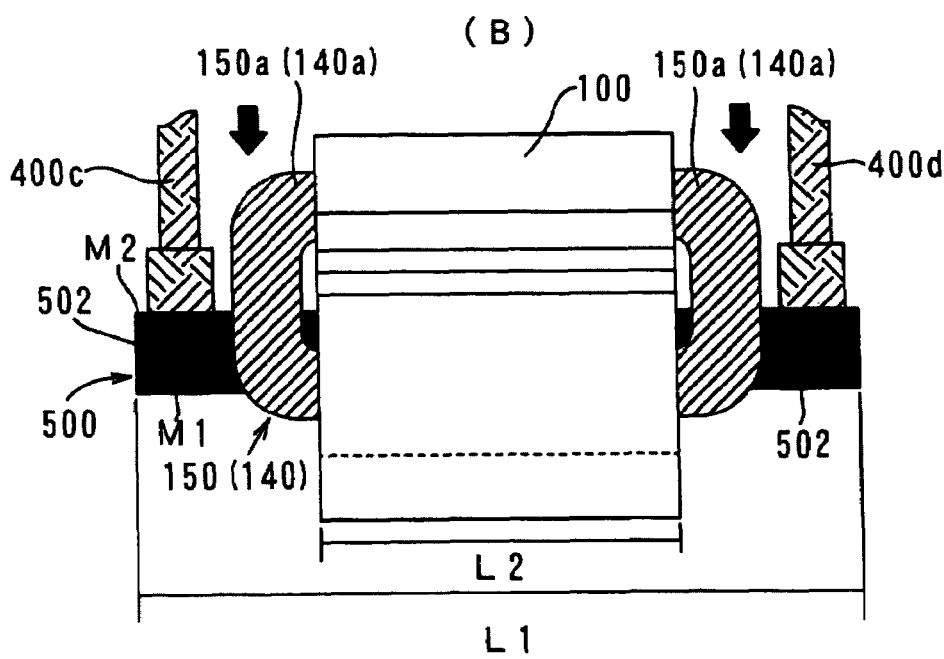

DEVICE FOR MANUFACTURING MOTOR

BACKGROUND OF THE INVENTION

1. Field of the Invention

The present invention relates to a method of manufacturing motors.

2. Description of the Related Art

An example of a stator of a conventional motor is shown in FIG. 29(A). In the known motor, a plurality of Y-shaped field poles 11 are formed on an inside surface 10a of a stator body 10. A coil 14 is wound around each of the field poles 11. Generally, an automatic winding machine is often used to wind a coil on the stator body 10. An example of the automatic winding machine is disclosed in Japanese non-examined laid-open Patent Publication No. 2000-14098. As shown in FIG. 29(B), the known winding machine winds a coil winding a number of turns on the field pole 11 into the coil receiving parts, such as coil winding n1 of a first turn and coil winding n2 of a second turn, one after another. Thus, coils 14 of many turns are installed on the field pole 11.

In the above-mentioned known art, the coil winding is wound on the field core 13 of the field pole 11 one turn at a time. Therefore, as the number of turns of the coil winding increases, as shown in FIG. 29(C), coil windings n50, n51 may possibly not be retained by the field pieces 12 of the field pole 11 and come away from the field pole 11. In order to prevent this problem, the number of turns of the coil winding is restricted according to the length of the pole pieces 12 of the field pole 11. On the other hand, it is important to secure an adequate number of turns of the coil winding on the stator body 10 in order to maintain a high output of the motor. Therefore, a more effective technique of installing coil winding is desired.

SUMMARY OF THE INVENTION

Accordingly, it is an object of the present invention to provide an effective technique for easily installing many turns of a coil winding on the stator body.

According to the invention, method of manufacturing a motor is provided. The motor may include a stator body, field cores, pole pieces, coil receiving parts. The method may include the steps of bending the pole pieces away from the coil receiving parts, inserting the tied coils into the coil receiving parts and bending the pole pieces bent away from the coil receiving parts toward the coil receiving parts, thereby retaining the coils in the coil receiving parts by the pole pieces. Because the pole pieces are once bent away from the coil receiving parts and then, the tied coils are inserted into the coil receiving parts, it is not necessary to retain each turn of the coil winding and therefore, number of turns of the coil winding is not restricted by the length of the pole pieces. As a result, high motor output can be ensured without uselessly upsizing the motor. Other objects, features and advantages of the present invention will be readily understood after reading the following detailed description together with the accompanying drawings and the claims.

BRIEF DESCRIPTION OF THE DRAWINGS

FIGS. 12(A) and 12(B) show the state in which the jig 500 is pressed by using cylinders 400c, 400d of an air press in order to press the pole pieces 112, 122 toward the slots 113, 123.

DETAILED DESCRIPTION OF THE INVENTION

Figure 1:
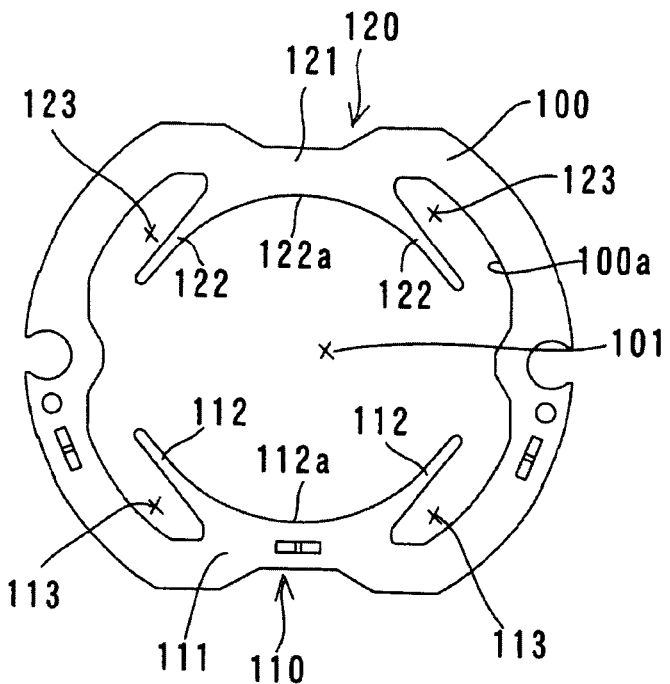
FIG. 1 shows a stator core 100 in a motor according to an embodiment of the invention.

According to the invention, a method of manufacturing a motor is provided. The motor has a stator body that includes a stator of the motor, field cores that protrude from the inside surface of the stator body, pole pieces that extend from the field cores in a manner of crossing with the field cores, coil receiving parts defined by a space facing the field cores, the pole pieces and the inside surface of the stator body, and tied coils retained in the coil receiving parts. The "stator body" may define a stator of the motor. When a cylindrical stator core is formed by laminating steel sheets having a shape identical to the sectional shape of a stator having a hollow part, both the steel sheets and the stator core may correspond to the "stator body". Further, when stator core segments are each formed by laminating steel sheets having a shape identical to the sectional shape of a stator segment and then the stator core segments are assembled together to form a cylindrical stator core, both the stator core segments and the stator core formed by assembling the segments may correspond to the "stator body".

The "field cores" protrudingly extend from the inside surface of the stator body. Preferably, the field cores may extend toward the center of the stator. The pole pieces may generally be referred to as a pole arc angle portion. The manner of "crossing with the field cores" suitably includes both the manner of crossing perpendicularly with the field cores and the manner of crossing obliquely with the field cores. Preferably, the pole pieces may symmetrically extend from the both sides of the upper end regions of the field core in the opposite directions while inclining slightly upward. Further, the "coil receiving parts" may generally be referred to as a slot. The field cores, pole pieces and coils form the field poles are utilized to generate a magnetic field in order to drive the rotor in the motor.

According to the invention, the method further includes the steps of bending the pole pieces away from the coil receiving parts, inserting the tied coils into the coil receiving parts and bending the pole pieces bent away from the coil receiving parts toward the coil receiving parts, thereby retaining the coils in the coil receiving parts by the pole pieces. The manner of "bending" the pole pieces includes not only the manner of bending the pole pieces into an acute angle, but the manner of bending the pole pieces into a smooth curve. Further, the manner of "bending" the pole pieces also includes both the manner of bending all the pole pieces into the same shape and the manner of bending one or more of the pole pieces into a different shape from that of the other pole pieces. The "tied coil" may embrace a coil that includes a tied coil winding of many turns. Preferably, the "tied coil" may include a coil unit which is pre-assembled by tying a coil winding of many turns together, besides the process of bending the pole pieces. Further, when the pole pieces are bent toward the coil receiving parts, the pole pieces may be either bent so as to be returned to the initial shape which they had before bent away from the coil receiving parts, or may be bent into a different shape from the initial shape.

According to the invention, the pole pieces are once bent away from the coil receiving parts and in this state, the tied coils are inserted into the coil receiving parts. Then, the pole pieces which have been bent away from the coil receiving parts are bent toward the coil receiving parts, so that the tied coils in the coil receiving parts can be retained by the pole pieces. By using the tied coil, it is not necessary to retain each turn of the coil winding, so that the number of turns of the coil winding is not restricted by the length of the pole pieces. Therefore, the number of turns of the coil winding to be inserted into the limited space of the coil receiving parts can be effectively increased. Thus, a high motor output can be ensured without uselessly upsizing the motor.

Further, because the pole pieces are once bent away from the coil receiving parts and then the tied coils are inserted into the coil receiving parts, the pole pieces can be reliably prevented from interfering with the coils and thus the inserting operation. Same, it is not necessary to design the pole pieces into a special shape which allows smooth insertion of the tied coils. As a result, a coil of many turns can be efficiently installed for a preexisting automatic winding machine without specially changing the design of the stator body.

Further, according to this invention, it is not necessary to manufacture a steel sheet having pole pieces shaped in advance to be spaced apart from the coil receiving parts in order to install a coil winding of many turns in the coil receiving parts. In other words, it is not necessary to manufacture a steel sheet in which the pole pieces widely occupy the central space of the stator core. Therefore, when this invention is applied to an actual manufacturing process, a steel sheet can be punch pressed into a steel sheet for the stator core and a steel sheet for a rotor at the same time. Thus, steel sheet can be effectively utilized and the material cost can be reduced.

Each of the additional features and method steps disclosed above and below may be utilized separately or in conjunction with other features and steps to provide improved method or manufacturing motors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Representative Embodiment)

First representative embodiment of the invention will now be described with reference to FIGS. 1 to 13. In this embodiment, a method of manufacturing an AC commutator motor (which may also be referred to as universal motor or series motor) having a rotor and a stator is described as an example. FIG. 1 schematically shows a stator core 100 of the AC commutator motor according to this embodiment. The stator core 100 includes a laminate of steel sheets having a sectional configuration shown in FIG. 1 and has a cylindrical shape having open ends and a hollow part 101 inside. The laminated stator core 100 has a longitudinal length of L2.

The stator core 100 is a feature that corresponds to the "stator body" of the invention.

A pair of field poles 110, 120 are oppositely disposed on an inside surface 100a of the stator core 100 shown in FIG. 1. The field poles 110, 120 include field cores 111, 121 and pairs of pole pieces 112, 122, respectively. The field cores 111, 121 protrude toward the hollow part 101. The pole pieces 112, 122 extend from the both side regions of the upper ends of the field cores 111, 121 in a manner of crossing with the field cores 111, 121. The pole pieces are also referred to as a pole arc angle portion. Inside surfaces 112a, 122a of the pole pieces 112, 122 that face the hollow part 101 have an arcuate shape of about 130° with respect to the center of the hollow part 101 when the pole pieces 112, 122 are in the initial position shown in FIG. 1.

Slots 113, 123 are defined on the both sides of the field poles 110, 120 by the field cores 111, 121, the pole pieces 112, 122 and the inside surface 100a of the stator core 100. The slots 113, 123 are spaces for receiving and retaining coil units 140, 150 (which will be described below and shown in FIG. 7). The slots 113, 123 are features that correspond to the "coil receiving parts" of the invention.

Figure 2:
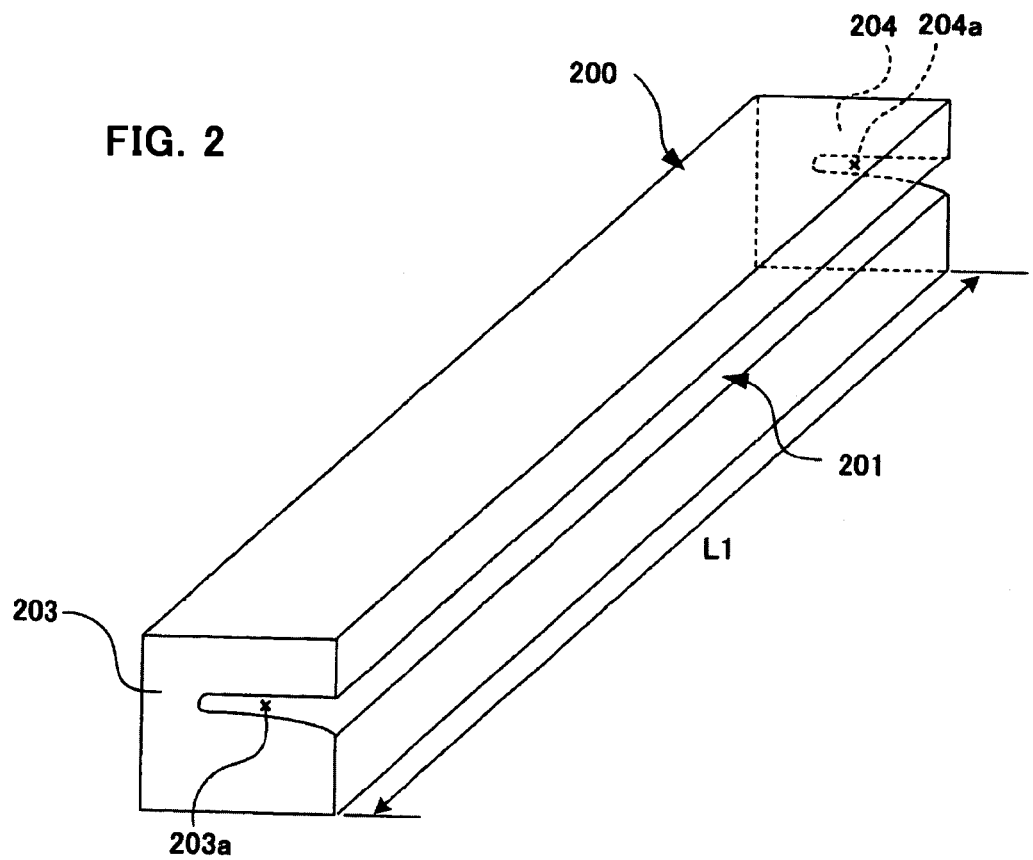
FIG. 2 is a perspective view of a jig 200.

Next, as shown in FIG. 2, two jigs 200 are prepared to be used for installing the coil units on the stator core 100. Each of the jigs 200 comprises an elongated rigid body having a length of L1 and having end surfaces 203, 204. A groove 201 is formed in the jig 200 and extends along the length of the jig 200. The groove 201 can engage the pole pieces 112, 122 shown in FIG. 1. The groove 201 has openings 203a, 204a that face the associated end surfaces 203, 204. The groove 201 is a feature that corresponds to the "retaining part to retain the pole pieces" of the invention.

Thus, jigs 200 are mounted to the pole pieces 112, 122 which are located adjacent to each other by engagement of the groove 201 with the pole pieces 112, 122, as shown in FIG. 3(A). Specifically, one of the openings 203a, 204a (see FIG. 2) is held in contact with the pole pieces 112, 122, and in this state, the jig 200 is inserted into the hollow part 101 of the stator core 100. Thus, each of the pole pieces 112, 122 are fitted in the groove 201 of the jig 200.

Figure 3:
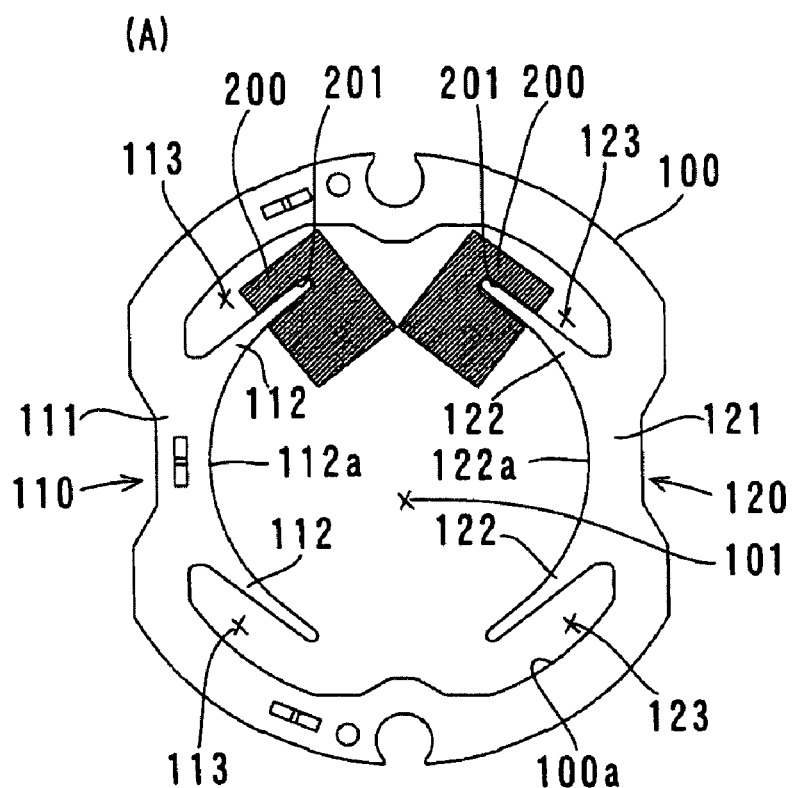
FIGS. 3(A) and 3(B) show the state in which the jig 200 is mounted to pole pieces 112, 122.
Figure 3:
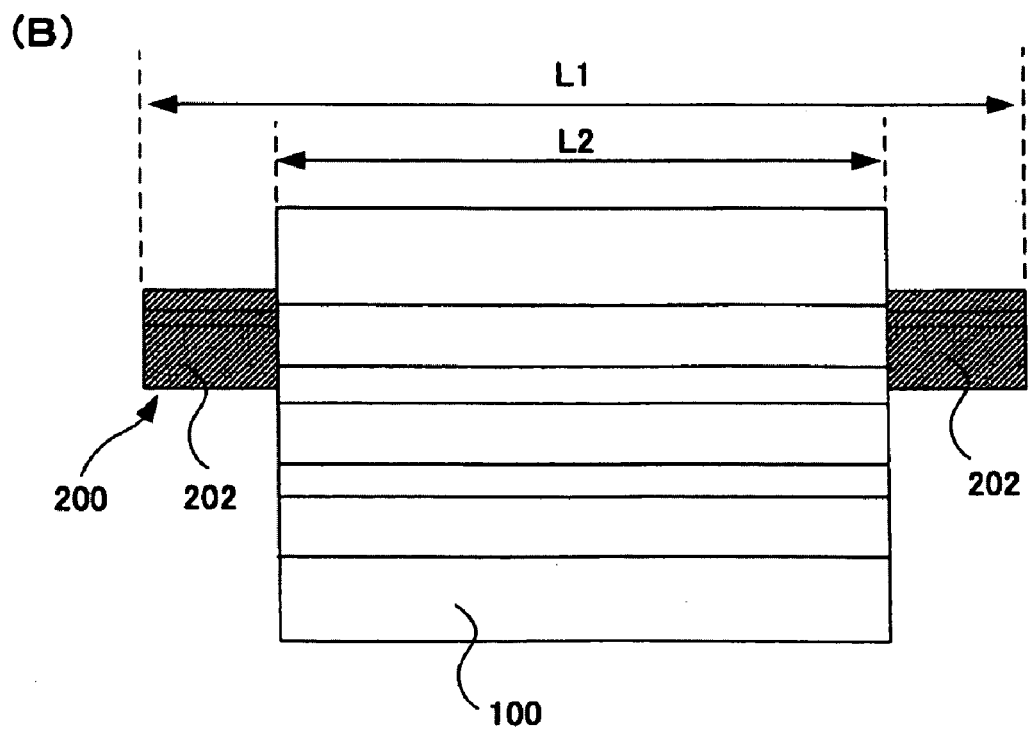

As seen from FIG. 3 showing the stator core 100 in side view, each of the jigs 200 has a longitudinal length L1 which is longer than the longitudinal length L2 of the stator core 100. Both end portions 202 of the jig 200 which have been mounted to the stator core 100 protrude out of the stator core 100 by a predetermined amount.

Figure 4:
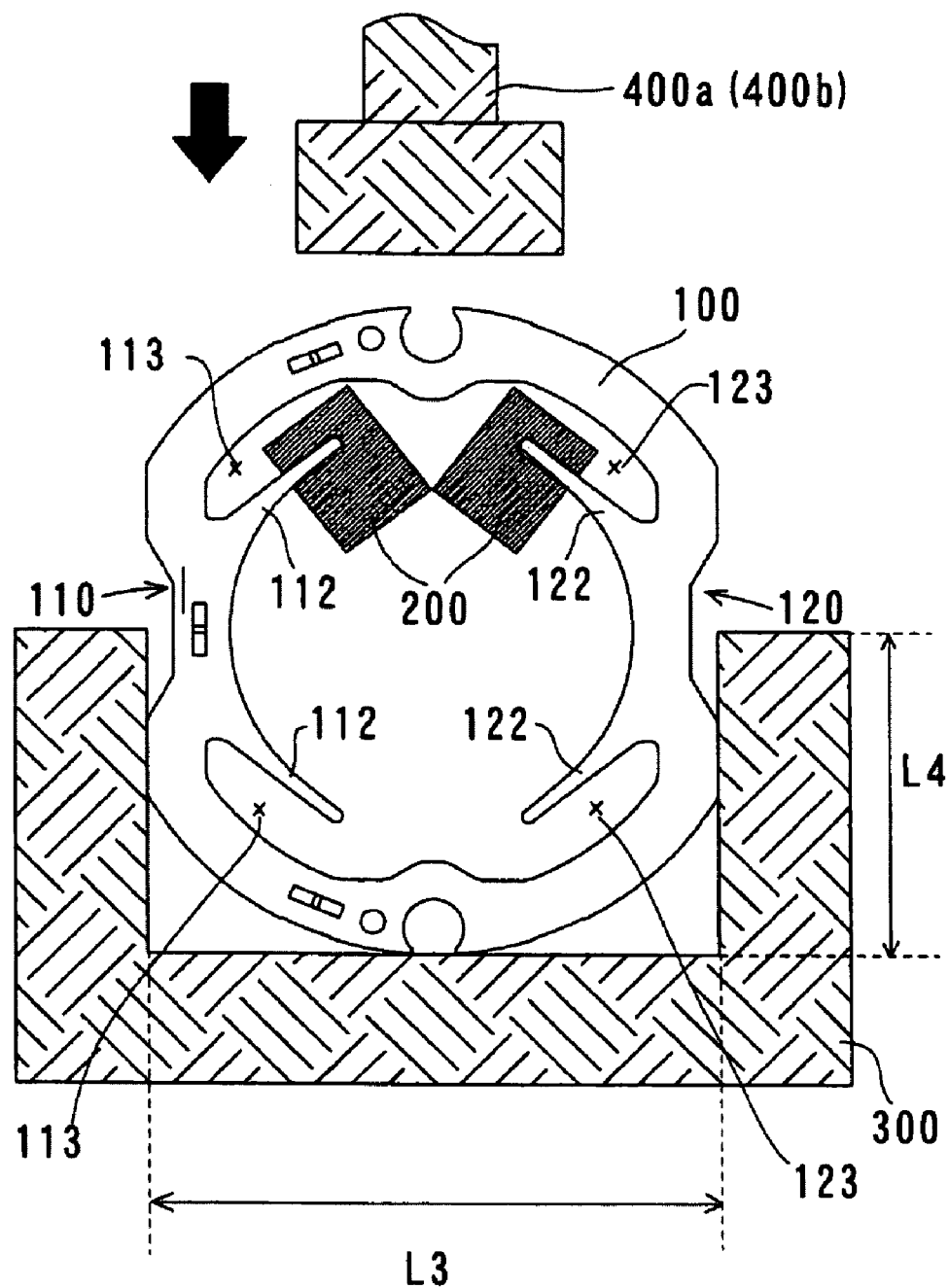
FIG. 4 shows the state in which the stator core 100 with the jigs 200 is placed on a fixing jig 300.
Figure 5:
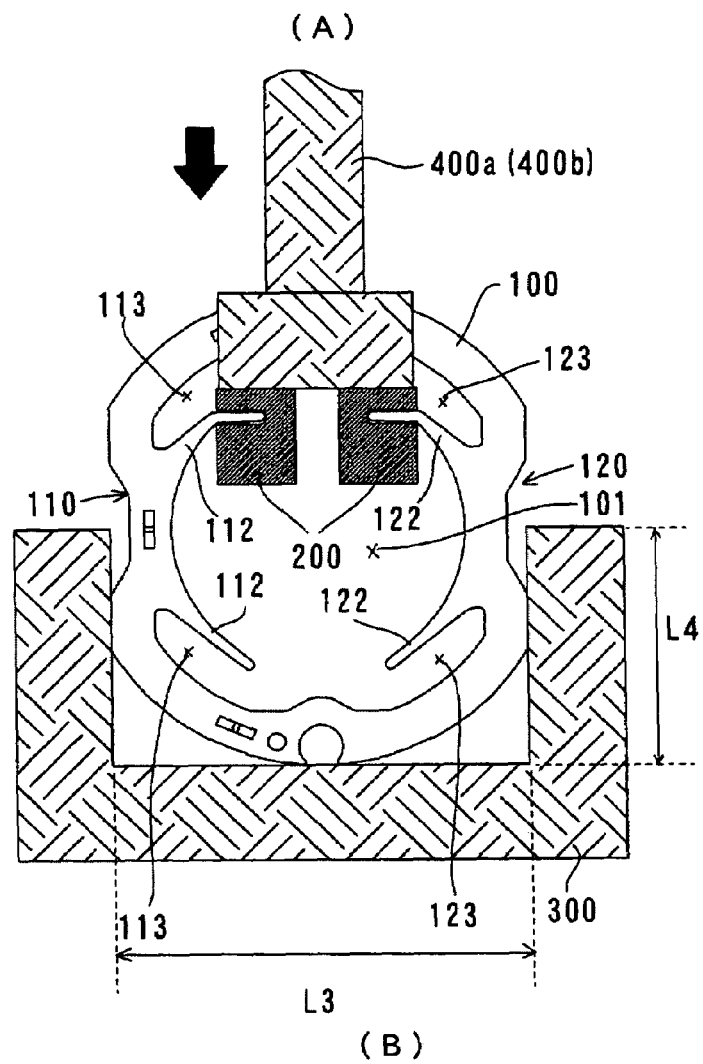
FIGS. 5(A) and 5(B) show the state in which the jigs 200 are pressed by using cylinders 400a, 400b of an air press in order to bend pole pieces 112, 122 away from slots 113, 123.
Figure 5:
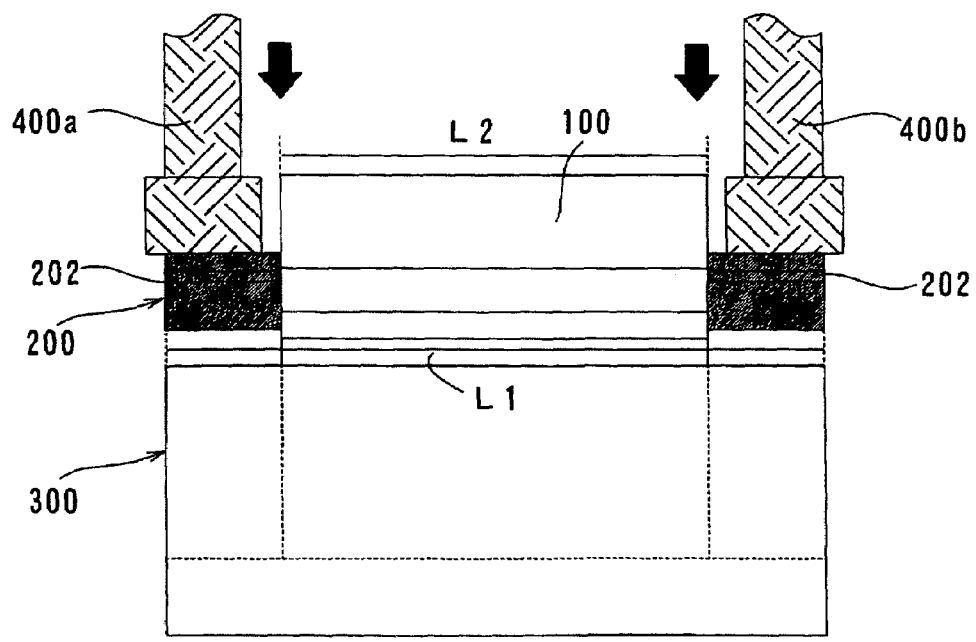

Next, as shown in FIG. 4, the stator core 100 with the jigs 200 is placed on a fixing jig 300 in such an orientation that the field poles 110, 120 are opposed to each other in the horizontal direction as viewed in the drawing and in which the pole pieces 112, 122 with the jigs 200 are on the upper side as viewed in the drawing. The fixing jig 300 is generally U-shaped in section and has a receiving part having a width of L3 and a depth of L4. The stator core 100 can be fixedly retained in the receiving part. Then, cylinders 400a, 400b which are actuated by an air press are positioned such that they can contact the end portions 202 of the jig 200 which protrude out of the stator core 100, as shown in FIG. 5(B). As shown in FIG. 4, the cylinders 400a, 400b are positioned above the stator core 100 which is set on the fixing jig 300, until starting the pressing operation.

Next, as shown in FIGS. 5(A) and 5(B), the cylinders 400a, 400b of the air press are moved from above (as viewed in the drawings) into contact with the end portions 202 of the jigs 200 which protrude out of the stator core 100 on the fixing jig 300. Then, the cylinders 400a, 400b are further moved downward to press the jigs 200 under a pressing load of about 2000 N. This pressing movement is a feature that corresponds to the movement of "pressing the end portions of the first jig away from the inside surface of the stator body" of the invention. As a result, the pole pieces 112, 122 are bent a predetermined angle away from the slots 113, 123. Preferably, the angle of each bend of the pole pieces 112, 122 is appropriately set such that the coil units 140, 150 can be readily inserted into the slots 113, 123 without interference with the pole pieces 112, 122. Further, as for the other pole pieces 112, 122 which are located on the lower side as viewed in FIG. 5(A), the stator core 100 is set upside down from the state shown in FIG. 4 on the fixing jig 300, and in the same manner as the above mentioned pole pieces 112, 122, they are also bent away from the slots 113, 123 by using the jigs 200, the fixing jig 300 and the air press.

Figure 6:
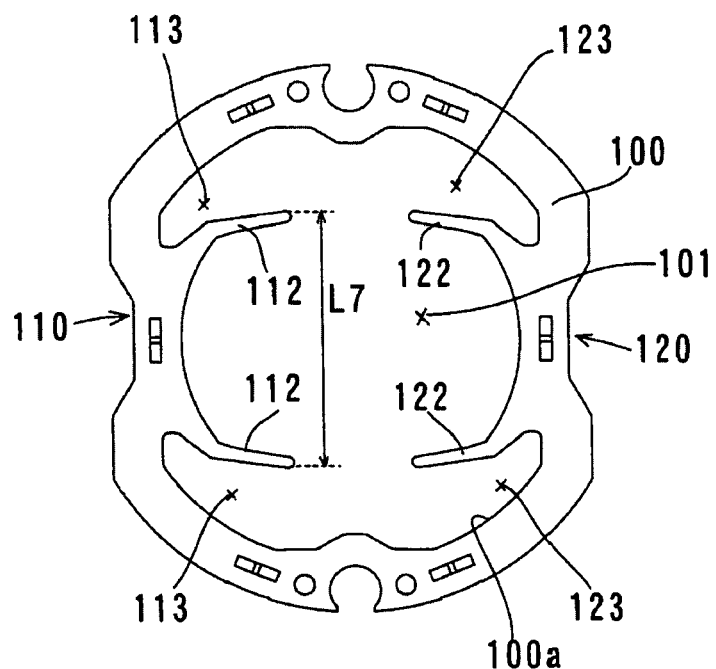
FIG. 6 shows the stator core 100 having the pole pieces 112, 122 which have been bent away from the slots 113, 123.

Thus, as shown in FIG. 6, all of the pole pieces 112, 122 can be bent away from the slots 113, 123 within the hollow part 101 of the stator core 100. The distance between the tip ends of the pole pieces 112 in the field pole 110 and the distance between the tip ends of the pole pieces 122 in the field pole 120 after the bending operation are defined as "L7".

Figure 7:
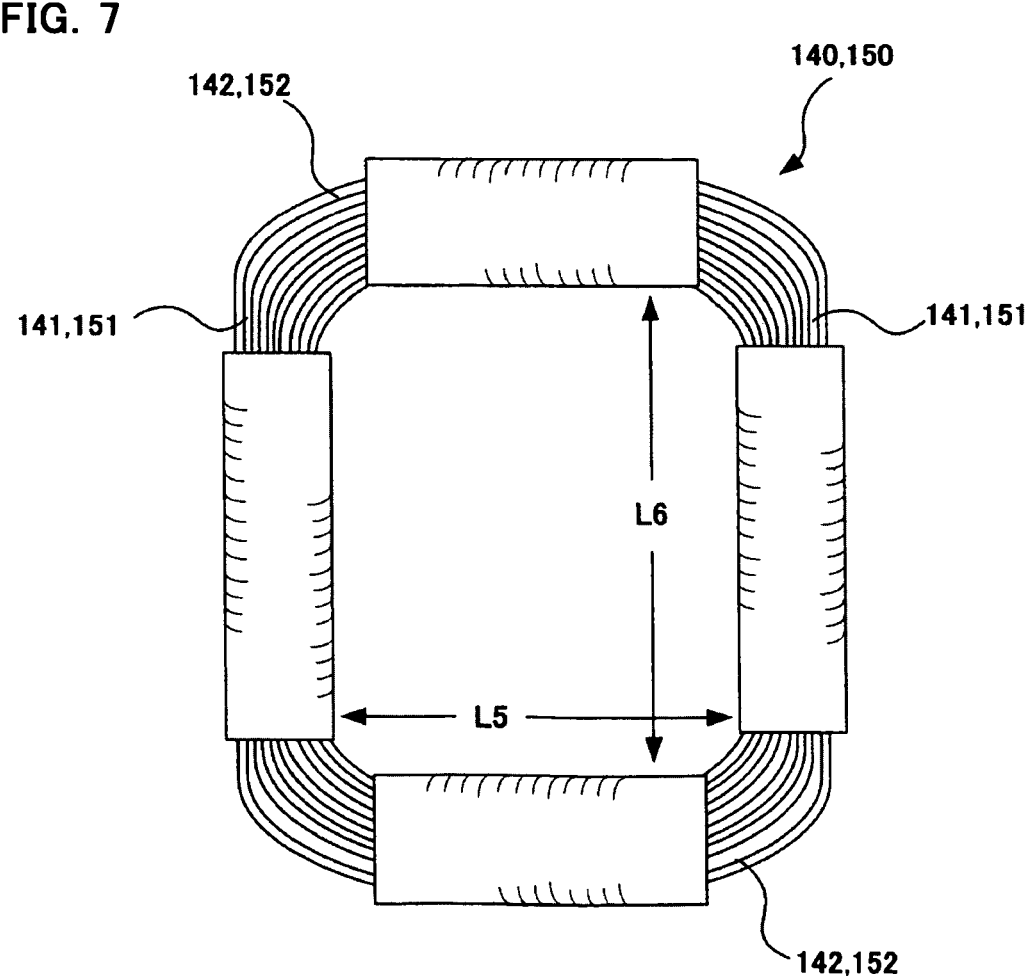
FIG. 7 shows coil units 140, 150 in plan view.

Next, as shown in FIG. 7, coil units 140, 150 having a tied coil winding are prepared. The coil units 140, 150 comprise a tied coil winding of a predetermined number of turns. The coil units 140, 150 have a rectangular shape having side portions 141, 151 and upper and lower portions 142, 152 around which insulating paper is wrapped. The coil units 140, 150 have an inside width of L5 (in the horizontal direction as viewed in FIG. 7) and an inside length of L6 (in the vertical direction as viewed in FIG. 7). The inside width L5 is substantially equal to or slightly larger than the distance L7 between the tip ends of the bent pole pieces 112 and 122 shown in FIG. 6. The inside length L6 is substantially equal to the longitudinal length L2 of the stator core 100 (see FIG. 3(B)).

Figure 8:
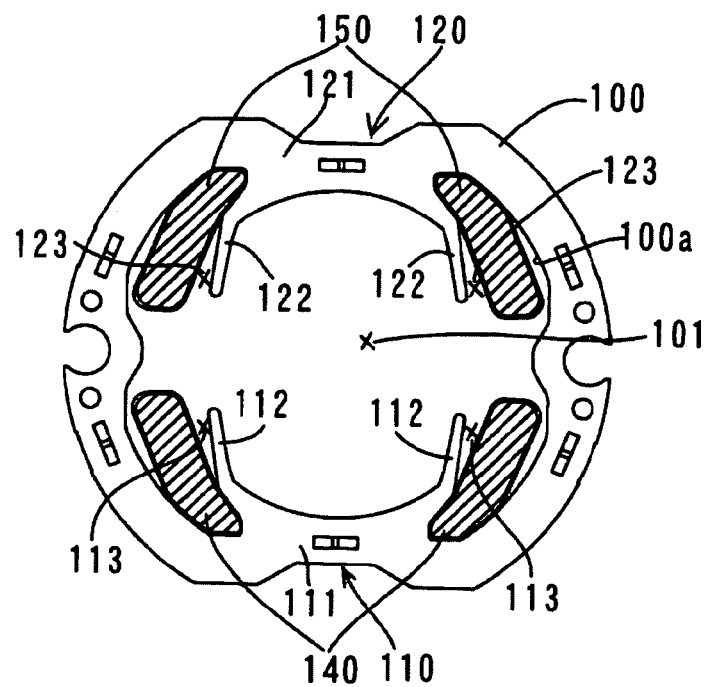
FIG. 8 shows the state in which the coil units 140, 150 are installed on the stator core 100 having the pole pieces 112, 122 which have been bent away from the slots 113, 123.

After the coil units 140, 150 having such a tied coil winding are thus prepared, as shown in FIG. 8, the coil unit 140 is mounted in the slots 113 in the field pole 110, while the coil unit 150 is mounted in the slots 123 in the field pole 120. At this time, because the pole pieces 112, 122 are bent away from the slots 113, 123, the pole pieces 112, 122 can be effectively prevented from interfering with the coil units 140, 150 when the coil units 140, 150 are inserted into the slots 113, 123. After the coil unit 150 has been inserted into the slot 113, although not shown, portions 140a (see FIG. 10(B)) of the coil unit 140 which protrude from the open ends of the stator core 100 are pressed simultaneously toward the outer circumferential surface of the stator core 100 from the both sides of the stator core 100 by using a primary coil forming machine. In this manner, the coil unit 140 fits into the depths of the slot 113 (in the field pole 111).

Figure 9:
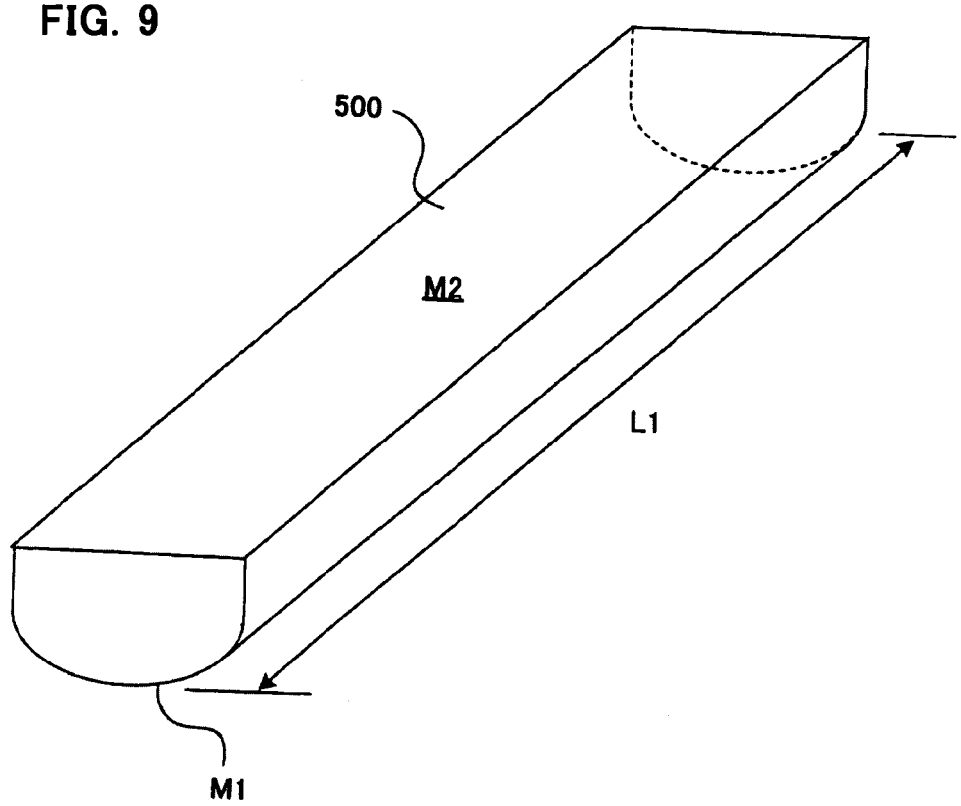
FIG. 9 shows a jig 500 in perspective view.
Figure 10:
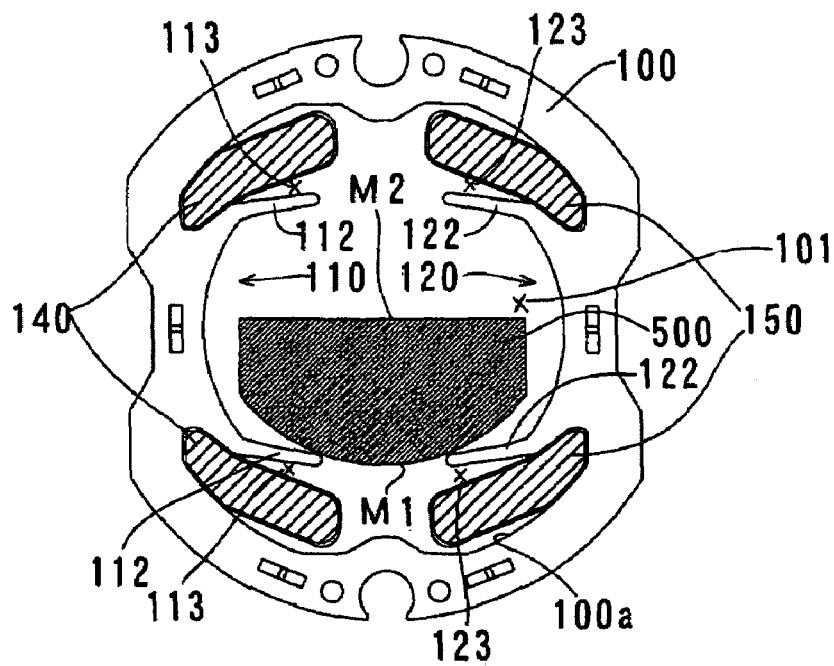
FIGS. 10(A) and 10(B) show the state in which the jig 500 is held in contact with the pole pieces 112, 122.
Figure 10:
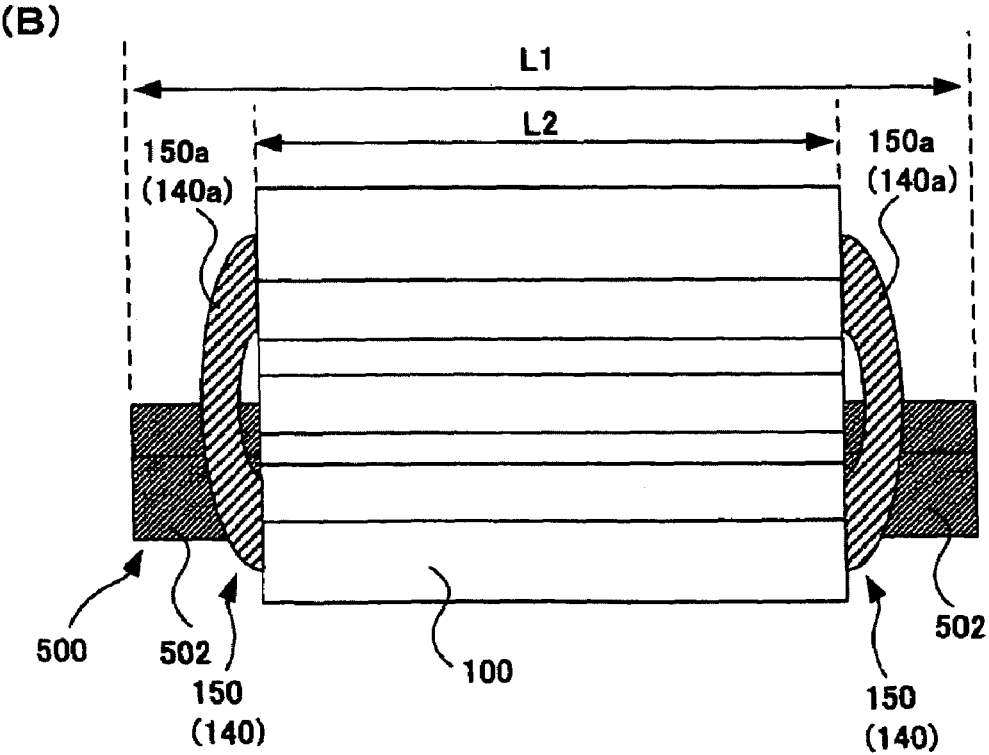

After the coil units 140, 150 have been inserted into the associated slots 113, 123, a jig 500, which is shown in FIG. 9, is prepared for bending the bent pole pieces 112, 122 again toward the slots 113, 123. The jig 500 includes an elongated rigid body having a length of L1. The jig 500 includes an arcuate surface (pressing surface) M1 and a flat surface M2 that faces the arcuate surface M1. The arcuate surface M1 is corresponding (complementary) to the inside surfaces 112a, 122a (see FIG. 1) of the pole pieces 112, 122 in the initial position. The arcuate surface M1 includes a pressing surface for pressing the pole pieces 112, 122 and is a feature that corresponds to the "pressing part" corresponding to the arcuate shape of the pole pieces in the invention.

As shown in FIG. 10(A), the jig 500 is inserted into the hollow part 101 of the stator core 100. The arcuate surface M1 of the jig 500 is held in contact with the pole pieces 112, 122 which are adjacent to each other. As shown in FIG. 10(B), the jig 500 has a longitudinal length of L1 longer than the longitudinal length L2 of the stator core 100. Both end portions 502 of the jig 500 mounted to the stator core 100 protrude out of the stator core 100 by a predetermined amount.

Figure 11:
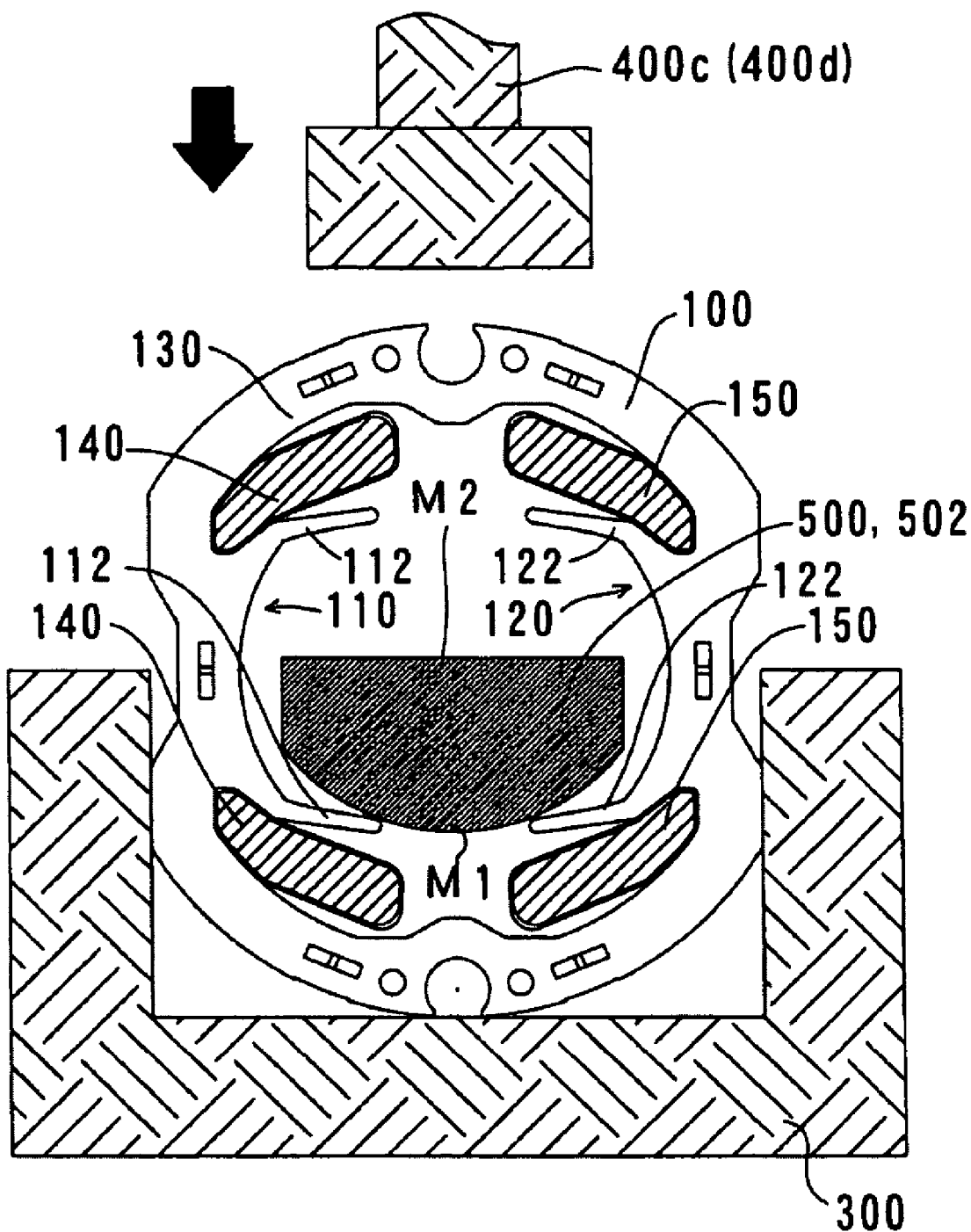
FIG. 11 shows the state in which the stator core 100 with the jig 500 is placed on the fixing jig 300.

Next, as shown in FIG. 11, the stator core 100 is placed on the fixing jig 300 in such an orientation that the field poles 110, 120 are opposed to each other in the horizontal direction as viewed in the drawing and in which the pole pieces 112, 122 in contact with the jig 500 are on the lower side as viewed in the drawing so that the flat surface M2 of the jig 500 faces upward as viewed in the drawing.

Next, as shown in FIGS. 12(A) and 12(B), cylinders 400c, 400d which are actuated by an air press move into contact with the flat surface M2 of the end portions 502 of the jig 500 which protrude out of the stator core 100. Then the cylinders 400c, 400d are further moved downward to press the jig 500 under a pressing load of about 2000 N. Thus, the pole pieces 112, 122 are pressed toward the slots 113, 123. At this time, because the arcuate surface M1 of the jig 500 correspond to the inside surfaces 112a, 122a of the pole pieces 112, 122 in the initial position, the pole pieces 112, 122 can be readily returned to the initial position by the pressing movement of the jig 500. Further, as for the other pole pieces 112, 122 which are located on the upper side as viewed in FIG. 12(A), the stator core 100 is set upside down (as viewed in FIG. 4) on the fixing jig 300, and in the same manner as the above mentioned pole pieces 112, 122, they are also pressed toward the slots 113, 123 and returned to the initial position by using the jig 500, the fixing jig 300 and the air press.

Figure 13:
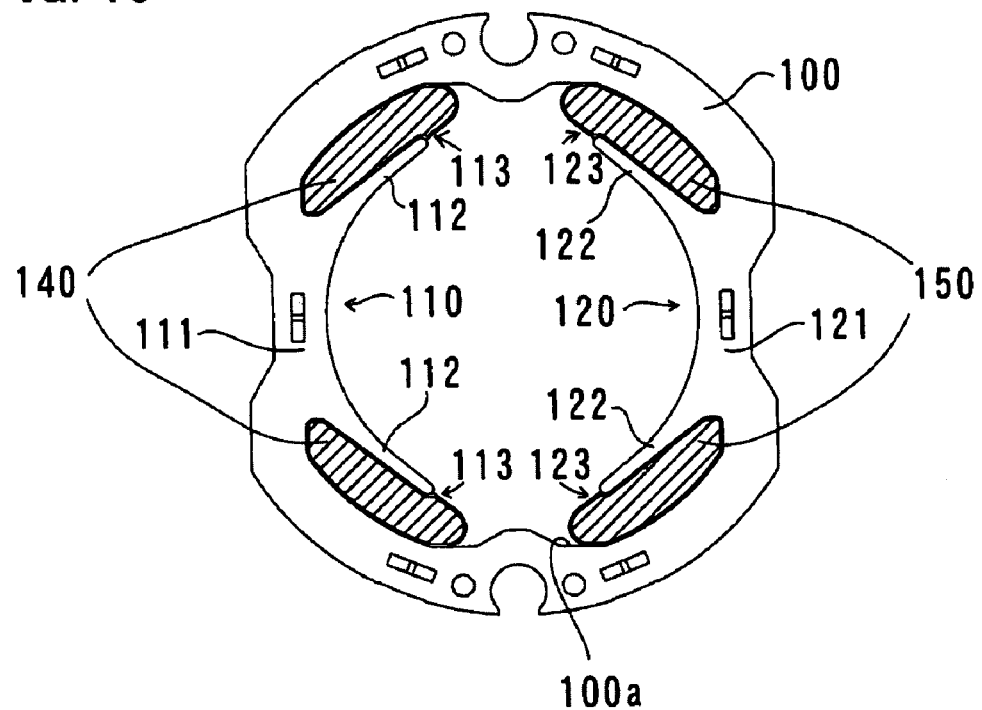
FIG. 13 schematically shows the stator core 100 having field poles 110, 120.

Then, although not shown, the coil units 140, 150 are subjected to secondary coil forming by using a secondary coil forming machine such that the portions 140a, 150a of the coil units 140, 150 which protrude from the ends of the stator core 100 have a proper shape in the longitudinal direction and in the inner circumferential direction. As a result, as shown in FIG. 13, the coil units 140, 150 inserted into the slots 113, 123 are retained by the pole pieces 112, 122 returned to the initial position. Thus, the field poles 110, 120 each having coil winding is formed on the inside surface 100a of the stator core 100. Further, as shown in FIG. 13, the tip ends of the pole pieces 112, 122 dig slightly into the coil units 140, 150, thereby more reliably retaining the coil units 140, 150.

According to the first embodiment, the pole pieces 112, 122 of the stator core 100 are bent away from the slots 113, 123. The coil units 140, 150 having the tied coil winding are inserted into the slots 113, 123, and then the pole pieces 112, 122 are returned to the initial position. By forming the field poles 110, 120 using the tied coil units 140, 150, the coil winding of many turns within the slots 113, 123 can be prevented from coming apart and being disengaged from the field poles 110, 120 over the pole pieces 112, 122. Moreover, by using the tied coil units 140, 150, it is not necessary to retain each turn of the coil winding, so that the number of turns of the coil winding is not restricted by the length of the pole pieces 112, 122. Therefore, the number of turns of the coil winding to be retained in the slots 113, 123 can be increased.

Further, because the pole pieces 112, 122 are bent away from the slots 113, 123, the pole pieces 112, 122 are prevented from interfering with the coil units 140, 150 when the coil units 140, 150 are inserted into the slots 113, 123. Therefore, known usual stator core 100 that includes pole pieces 112, 122 can be used as such.

(Second Representative Embodiment)

Figure 14:
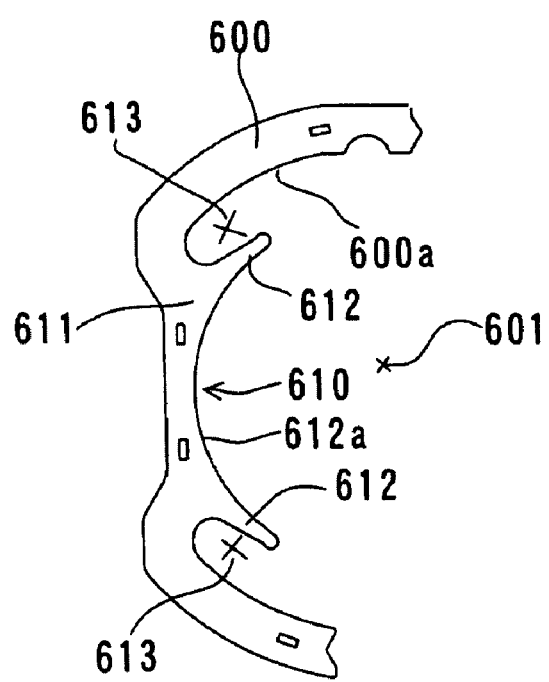
FIG. 14 schematically shows the stator core half 600 according to the second embodiment.

The second embodiment as shown in FIG. 14 includes a stator core half 600 which has a shape of one half of the stator core 100 of the first embodiment. The stator core half 600 includes a laminate of steel sheets having a sectional configuration as shown in FIG. 14 and has a generally C-shaped section having an opening 601. A stator core is formed by assembling two such laminated stator core halves 600 to each other.

A field pole 610 is disposed on an inside surface 600a of the stator core half 600. The field pole 610 has substantially the same construction as the field pole 110 of the first embodiment. The field pole 610 is formed by a field core 611, a pair of pole pieces 612, an inside surface 612a of the arcuate pole pieces 612 which faces the opening 601, and slots 613. The field core 611 extends upright from the inside surface 600a. The pole pieces 612 extend from the both sides of the upper end regions of the field core 611 so as to cross with the field core 611. The slots 613 are defined between the pole pieces 612 and the inside surface 600a.

Figure 15:
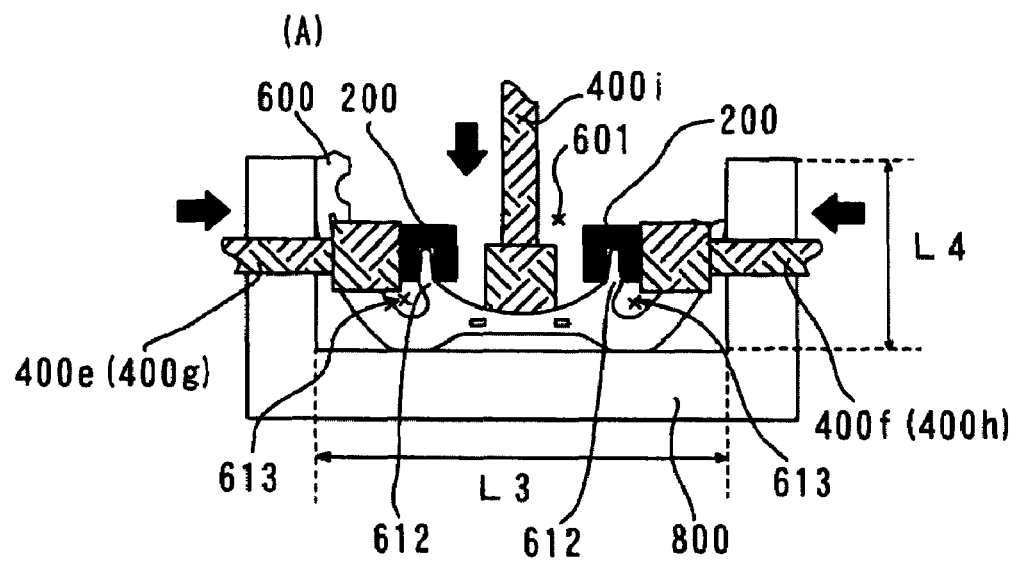
FIGS. 15(A) and 15(B) show the state in which the jigs 200 are pressed by using cylinders 400e, 400f, 400g, 400h of an air press in order to bend the pole pieces 612 away from the slots 613.
Figure 15:
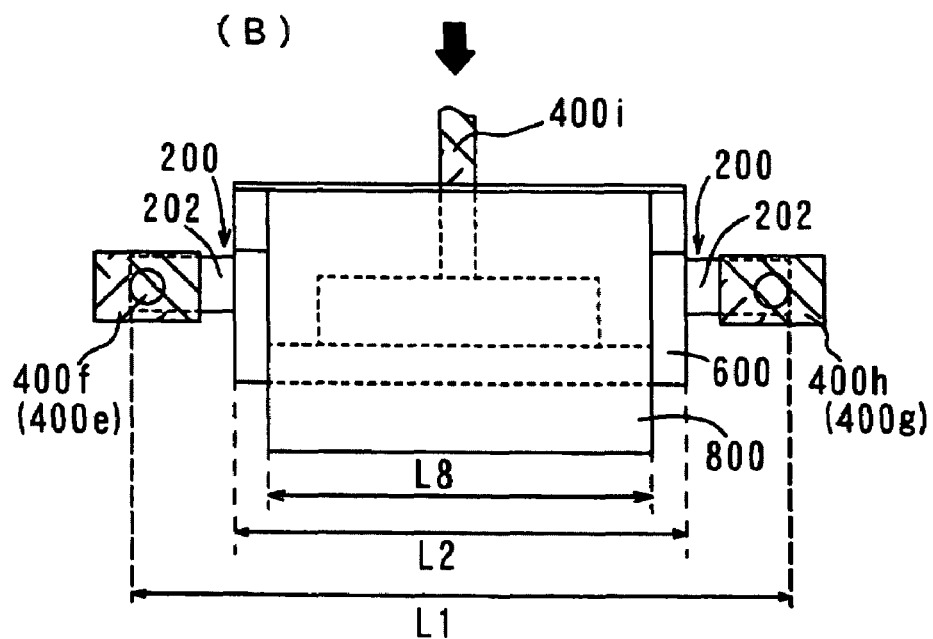

The jigs 200 as shown in FIG. 2 are mounted to the pole pieces 612. Then as shown in FIG. 15(A), the stator core half 600 with the jigs 200 is placed on a fixing jig 800 such that the opening 601 faces upward. As shown in FIG. 15(B), the fixing jig 800 has a longitudinal length L8 taht is slightly shorter than the length L2 of the stator core half 600. Further, the length L2 of the stator core half 600 is shorter than the longitudinal length L1 of the jig 200. Both end portions 202 of the jig 200 protrude out of the stator core half 600.

Next, cylinders 400e, 400g of an air press are moved from the left side (as viewed in FIG. 15(A)) into contact with the end portions 202 of the jigs 200 which protrude through the both end surfaces of the stator core half 600, while cylinders 400f, 400h are moved from the right side (as viewed in FIG. 15(A)) into contact with the end portions 202 of the jigs 200 which protrude through the both end surfaces of the stator core half 600. Further, the intermediate portions between the pole pieces 612 is pressed from above (as viewed in FIG. 15(A)) by a cylinder 400i, so that the stator core half 600 is locked against moving upward from the bottom of the fixing jig 800. In this state, as shown in FIG. 15(B) which shows the fixing jig 800 in side view, the cylinders 400e, 400f and the cylinders 400g, 400h are in contact with the end portions 202 of the jigs 200 which protrude from the stator core half 600, while the cylinder 400i is in contact with the stator core half 600 in the central part of the fixing jig 800. In this state, each of the cylinders 400e, 400f, 400g, 400h is actuated to bend the pole pieces 612 a predetermined angle away from the slots 613. Next, the coil unit 140 shown in FIG. 7 is prepared and inserted into the slots 613 shown in FIG. 15(A). At this time, because the pole pieces 612 are bent away from the slots 613, the pole pieces 612 are prevented from interfering with the coil unit 140 when the coil unit 140 is inserted into the slots 613. Thus, the coil unit 140 can be smoothly inserted into the slots 613.

Figure 16:
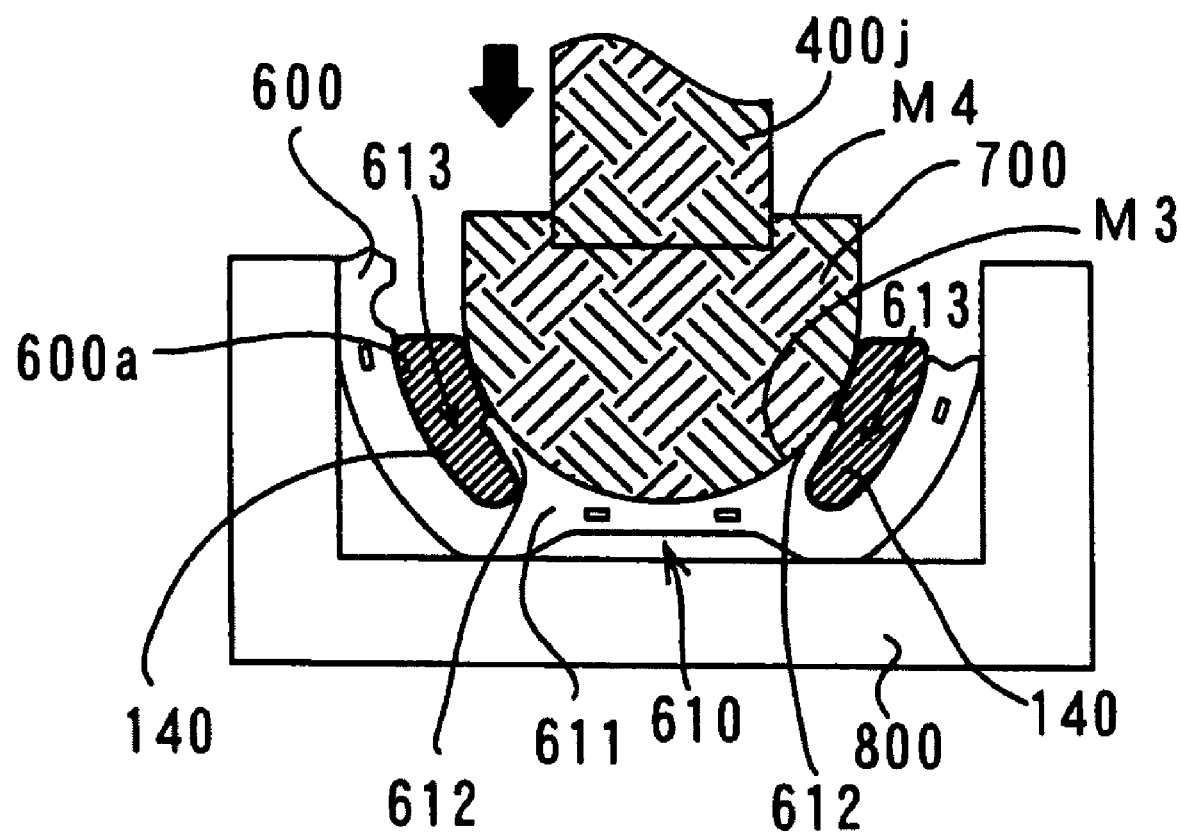
FIG. 16 shows the state in which pole pieces 612 are pressed by using a cylinder 400j of an air press on which the jig 700 is mounted in order to press the pole pieces 612 toward the slots 613.

Next, as shown in FIG. 16, the stator core half 600 having the coil unit 140 in the slots 613 is placed in the fixing jig 800. Then, a jig 700 for bending the bent pole pieces 612 again toward the slots 613 is placed in the fixing jig 800. The jig 700 includes an arcuate pressing surface M3 for pressing the pole pieces 612 and a flat surface M4. The arcuate pressing surface M3 corresponds to the pole pieces 612 in the initial position. The flat surface M4 has a recess which can engage a cylinder 400j of the air press.

Then, the jig 700 is engaged with the cylinder 400j and the pressing surface (arcuate surface) M3 contacts and presses the pole pieces 612. Because the arcuate surface M3 of the jig 700 corresponds to the inside surface 612a of the pole pieces 612 in the initial position, the pole pieces 612 can be bent into an arcuate shape and returned to the initial position by the downward movement of the cylinder 400j.

As a result, as shown in FIG. 16, the coil unit 140 inserted into the slots 613 is received and retained by the pole pieces 612 bent and returned to the initial position. Thus, the field pole 610 having a coil winding is formed on the inside surface 600a of the stator core half 600. Two such stator core halves 600 are oppositely connected and welded together to obtain a cylindrical stator core having open ends which is similar to the stator core of the first embodiment.

(Third Representative Embodiment)

Figure 17:
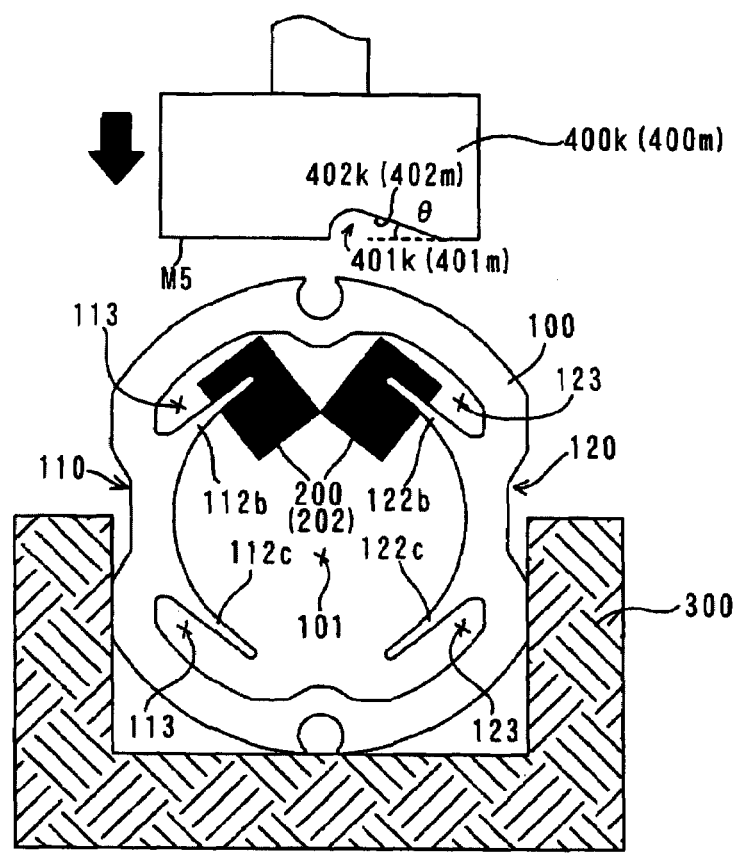
FIG. 17 shows the state in which the jigs 200 are mounted to the pole pieces of the stator core 100, the stator core 100 is placed on the fixing jig 300, and cylinders 400k, 400m having notches 401k, 401m are prepared.

According to the third embodiment as shown in FIG. 17, cylinders 400k, 400m having bottom surfaces M5 are used in place of the cylinders 400a, 400b (see FIG. 4). Notches (recesses) 401k, 401m are formed in the bottom surfaces M5 of the cylinders 400k, 400m and can engage the jig 200 mounted to a pole piece 122b. The notches 401k, 401m have inclined surfaces 402k, 402m that form a predetermined inclination θ with respect to the bottom surfaces M5.

First, the jigs 200 as shown in FIG. 2 and the fixing jig 300 as shown in FIG. 4 are prepared. Then as shown in FIG. 17, the jigs 200 are mounted to pole pieces 112b, 122b such that the end portions 202 of the jigs 200 protrude through the both end surfaces of the stator core 100 (see FIG. 5(B) of the first embodiment). The stator core 100 with the jigs 200 is placed on the fixing jig 300 such that the field poles 110, 120 are opposed to each other in the horizontal direction as viewed in the drawing and in which the pole pieces 112b, 122b with the jigs 200 are on the upper side as viewed in the drawing.

Figure 18:
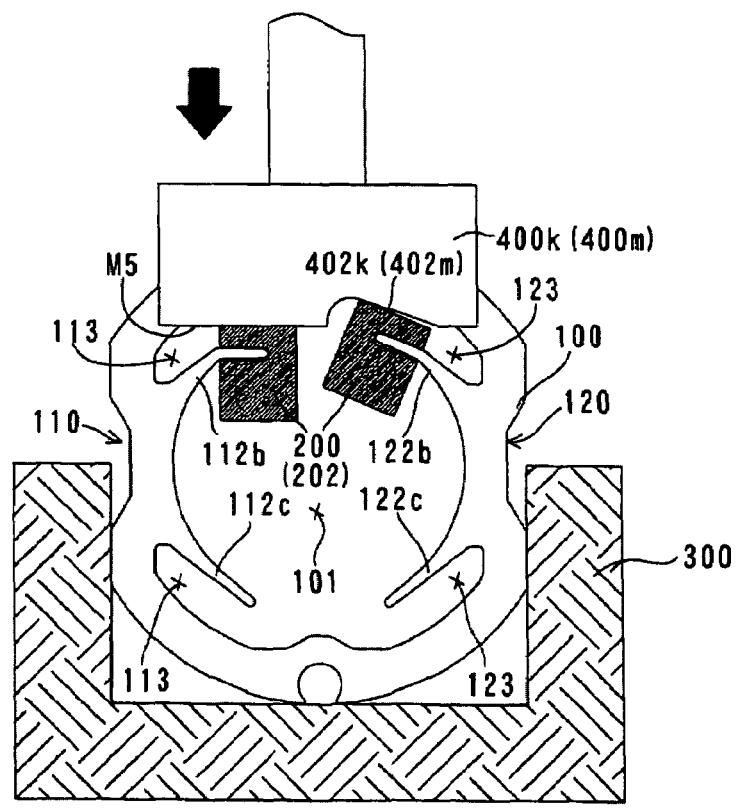
FIG. 18 shows the state in which the end portions 202 of the jigs 200 are pressed by using cylinders 400k, 400m in order to bend pole pieces 112b, 122b away from the slots 113, 123.

Next, the cylinders 400k, 400m of the air press are moved from into contact with the end portions 202 of the jigs 200 which protrude through the both end surfaces of the stator core 100 on the fixing jig 300. The jig 200 on the pole piece 112b contacts the bottom surface M5 of the cylinders 400k, 400m, and the other jig 200 on the pole piece 122b contacts the inclined surfaces 402k, 402m of the notches 401k, 401m. Then, as shown in FIG. 18, the cylinders 400k, 400m are moved downward to press the end portions 202 of the jigs 200 from above. Thus, the pole pieces 112b, 122b are bent away from the slots 113, 123 via the jigs 200. However, the pole piece 122b that is pressed in contact with the inclined surfaces 402k, 402m is bent a smaller angle than the pole piece 112b that is pressed in contact with the bottom surface M5.

As for the other pole pieces located on the lower side as viewed in FIG. 18, the stator core 100 is set upside down on the fixing jig 300. Then, the end portions 202 of the jigs 200 are pressed from above by using the cylinders 400a, 400b (see FIGS. 4 and 5) which are used in the first embodiment and do not have a notch.

Figure 19:
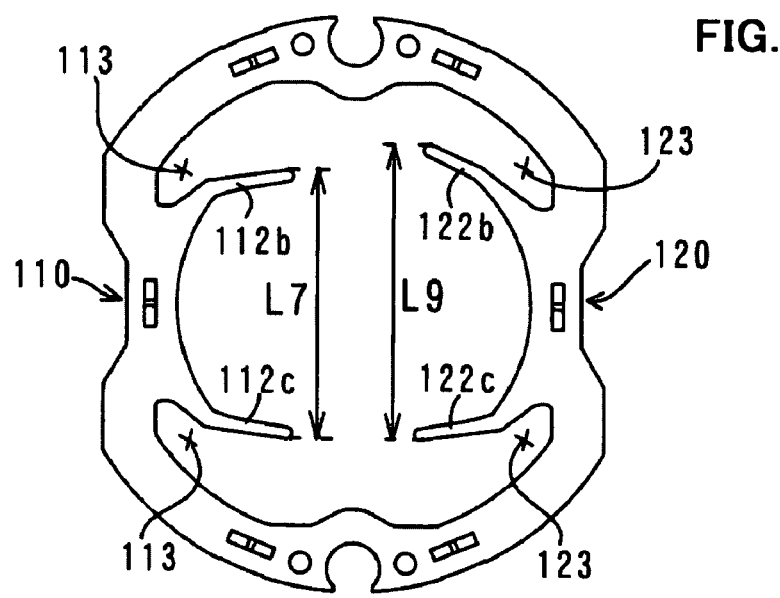
FIG. 19 shows the stator core 100 in the state in which the pole pieces 112b, 112c, 122b, 122c are bent away from the slots 113, 123. The pole piece 122b is bent a smaller angle than the other pole pieces 112b, 112c, 122c.

Thus, as shown in FIG. 19, all of the pole pieces 112b, 112c, 122b, 122c can be bent away from the slots 113, 123 within the hollow part 101 of the stator core 100. The distance between the tip ends of the pole pieces 112b and 112c in the field pole 110 and the distance between the tip ends of the pole pieces 122b and 122c in the field pole 120 after the bending operation are defined as "L7" and "L9", respectively. The pole piece 122b is bent a smaller angle than the other pole pieces 112b, 112c, 122c as mentioned above, so that the stator core 100 is formed such that the distance L9 is longer than the distance L7.

Figure 20:
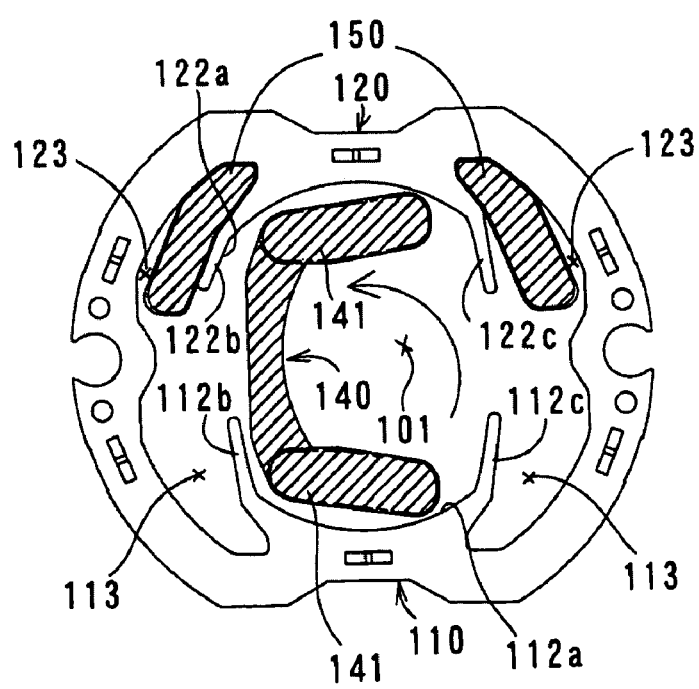
FIG. 20 shows the state in which the coil unit 140 is installed in the slots 113 while being rotated by using the pole piece 122b, which has been bent a smaller angle, as a guide.

Then, the coil units 140, 150 (see FIG. 7) are prepared and, as shown in FIG. 20, the coil unit 150 is installed in the slots 123 in the field pole 120. Then, the coil unit 140 is inserted into the hollow part 101 such that the both side portions 141 of the coil unit 140 face the associated inside surfaces 112a, 122a of the pole pieces. Thereafter, one of the side portions 141 of the coil unit 140 (which is located on the upper side as viewed in FIG. 20) is inserted into one of the slots 113 (which is located on the left side as viewed in FIG. 20) while being rotated along the inside surface 122a on the side of the pole piece 122b. At the same time, the other side portion 141 is inserted into the other slot 113 (which is located on the right side as viewed in FIG. 20). In this manner, the coil unit 140 is mounted in the slots 113 while being rotated about 90 degrees counterclockwise as viewed in the drawing by using the pole piece 122b as a guide.

If all of pole pieces are bent the same angle, the coil unit 140 mounted after the first coil unit may not be easily installed in the slots of the stator core due to interference with the first coil unit. To the contrary, according to the embodiment as shown in FIG. 20, the second coil unit is inserted into the hollow part such that the both side surfaces of the coil unit face the associated inside surfaces of the pole pieces. Thereafter, the second coil unit is inserted into the slots while being rotated along the inside surfaces of the pole pieces by using the pole piece that has been bent a smaller degree, as a guide. With this construction and method, the coil unit can be more easily installed into the slots.

(Motor Manufacturing Device for Assembling a Cylindrical Stator Core Having Open Ends)

Figure 21:
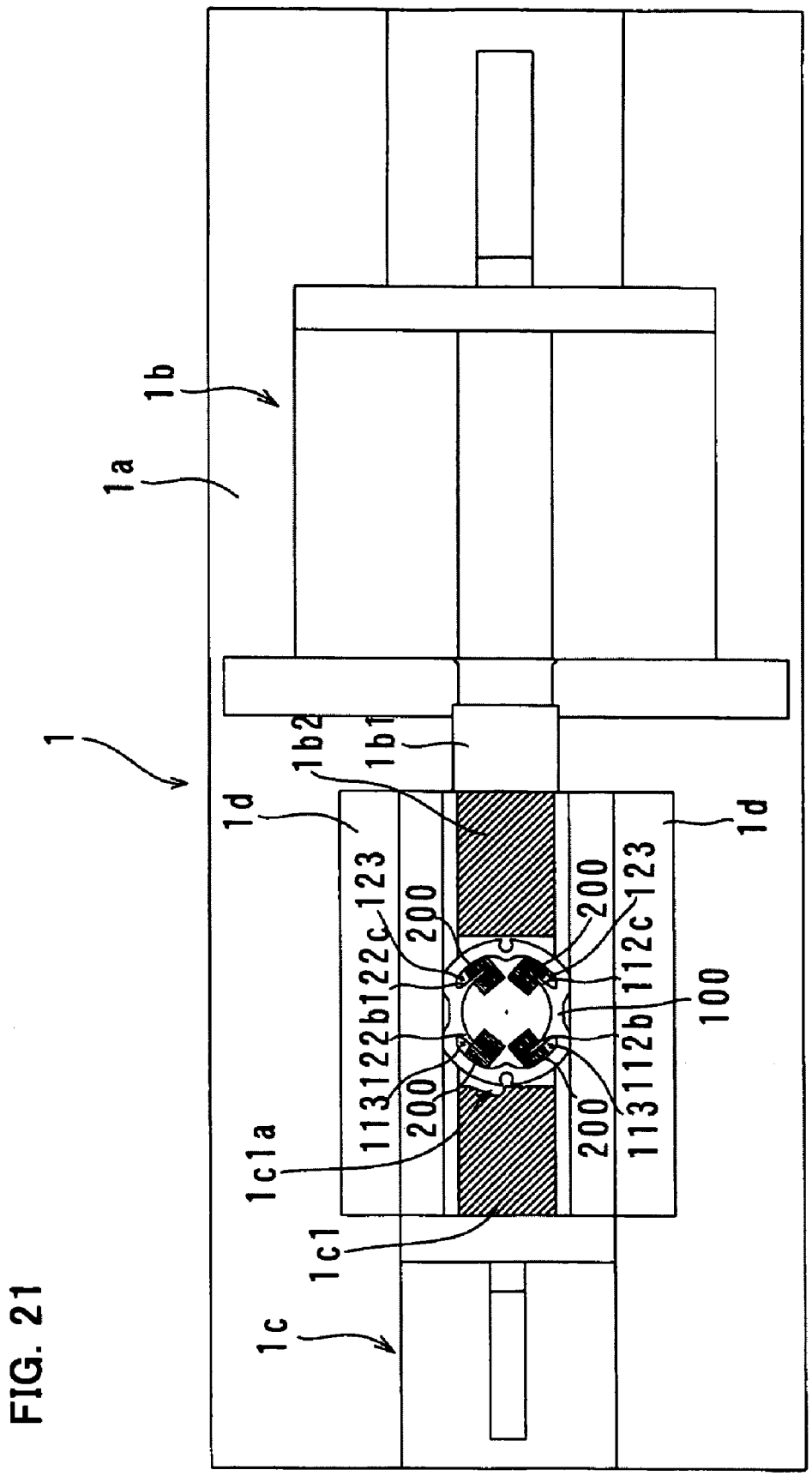
FIG. 21 is a plan view showing a motor manufacturing device 1 that bends the pole pieces 112b, 112c, 122b, 122c of the cylindrical stator core 100 having open ends, away from the slots 113, 123.
Figure 22:
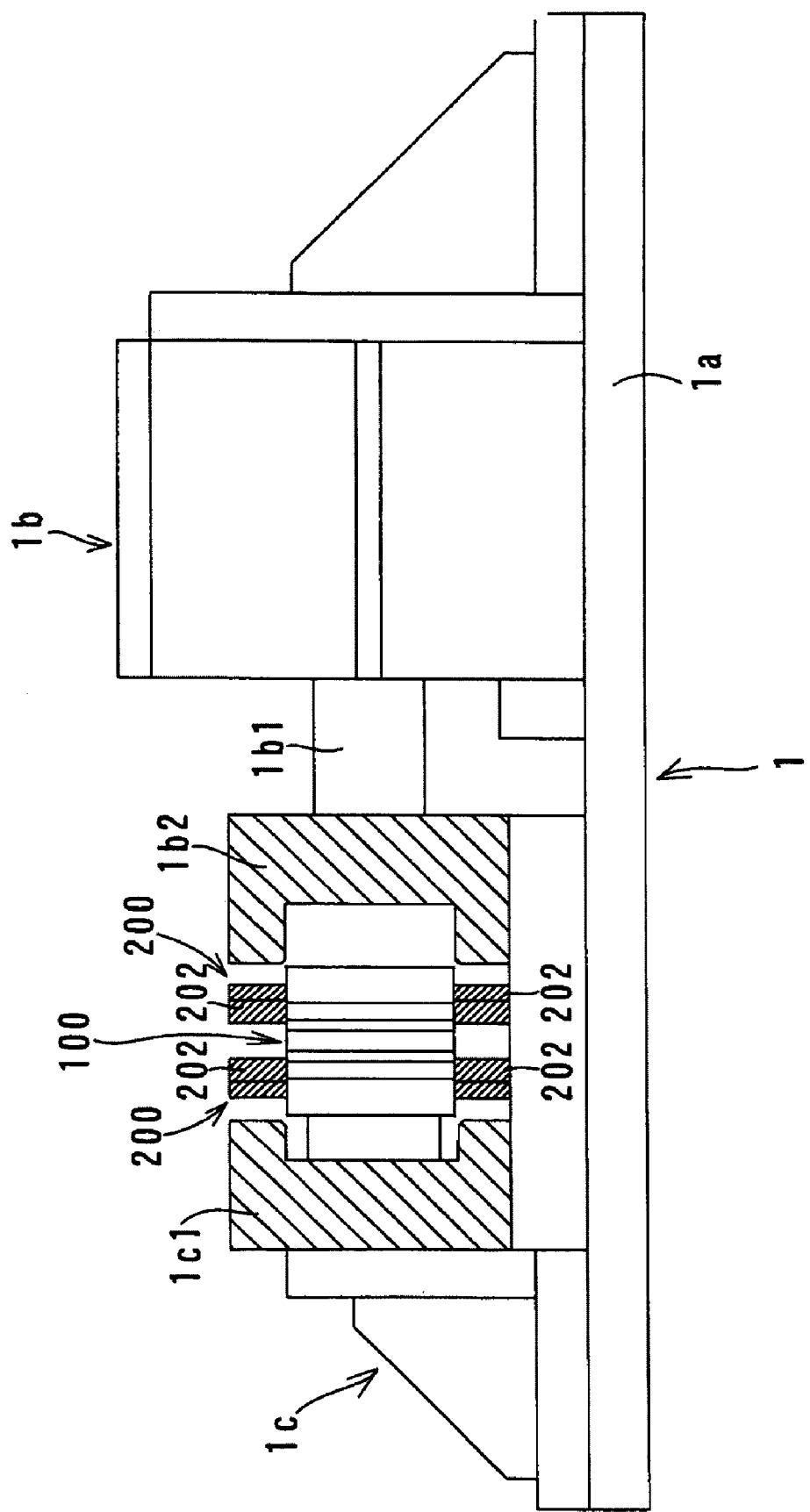
FIG. 22 is a side view showing the motor manufacturing device 1.

Now, a motor manufacturing device 1 that embodies the motor manufacturing method of the above-mentioned representative embodiments will be explained with reference to FIGS. 21 and 22. The motor manufacturing device 1 serves to bend the pole pieces 112b, 112c, 122b, 122c of the cylindrical stator core 100 away from the slots 113, 123 like in the third embodiment. As shown in FIGS. 21 and 22, the motor manufacturing device 1 includes a generally rectangular base 1a, a pressing device 1b mounted on the base 1a, a fixture 1c, a pair of guides 1d, and the jigs 200 (see FIG. 2) to be mounted to the pole pieces. The pressing device 1b is mounted on one end portion of the base 1a in the longitudinal direction, and the fixture 1c is mounted on the other end portion of the base 1a in the longitudinal direction. The guides 1d are disposed between the pressing device 1b and the fixture 1c and extend parallel to each other in the longitudinal direction.

The pressing device 1b has an air cylinder 1b1 slidable in the horizontal direction. A pressing member 1b2 is generally C-shaped in vertical section. The pressing member 1b2 is connected to the end of the air cylinder 1b1 such that the opening of the C-shaped pressing member 1b2 faces leftward as viewed in the drawing. Further, a pressing member 1c1 is also generally C-shaped in vertical section and connected to the fixture 1c such that the opening of the C-shaped pressing member 1c1 faces rightward as viewed in the drawings. The pressing member 1c1 is locked between the guides 1d, while the pressing member 1b2 is slidably supported between the guides 1d. Further, the pressing member 1c1 has a notch 1c1a that contacts the jig 200 mounted on the pole piece 122b.

The jigs 200 are mounted on the pole pieces 112b, 112c, 122b, 122c of the stator core 100. The stator core 100 is placed between the pressing members 1b2 and 1c1 such that the longitudinal direction of the stator core 100 coincides with a vertical direction. A stator core holder is mounted on the pressing member 1c1 via an elastic element (not shown). The stator core holder holds the stator core 100 while controlling the placement of the stator core 100. The both end portions 202 of the jig 200 protrude from the both open ends of the stator core 100.

Then, although not shown, an actuating switch of the pressing device 1b is operated to cause the air cylinder 1b1 to slide toward the stator core 100 (leftward as viewed in FIGS. 21 and 22). Upon the movement of the air cylinder 1b1, the generally C-shaped pressing member 1b2 connected to the end of the air cylinder 1b1 slides leftward. At this time, the protruding upper and lower portions of the pressing member 1b2 contact the both end portions 202 of the jigs 200 mounted on the pole pieces 112c, 122c (or located on the right side as viewed in FIG. 22). When the air cylinder 1b1 is further moved leftward, the stator core 100 which is retained by the stator core holder slightly moves leftward. At this time, the protruding upper and lower portions of the pressing member 1c1 contact the both end portions 202 of the jigs 200 mounted on the pole pieces 112b, 122b (or located on the left side as viewed in FIG. 22). When the air cylinder 1b1 is further moved leftward, the both end portions 202 of all the jigs 200 are pressed toward the center of the stator core 100 from the both sides.

In this manner, the pole pieces 112b, 112c, 122b, 122c are bent away from the slots 113, 123. As a result, the stator core 100 having the bent pole pieces 112b, 112c, 122b, 122c as shown in FIG. 19 is obtained by this process.

Figure 23:
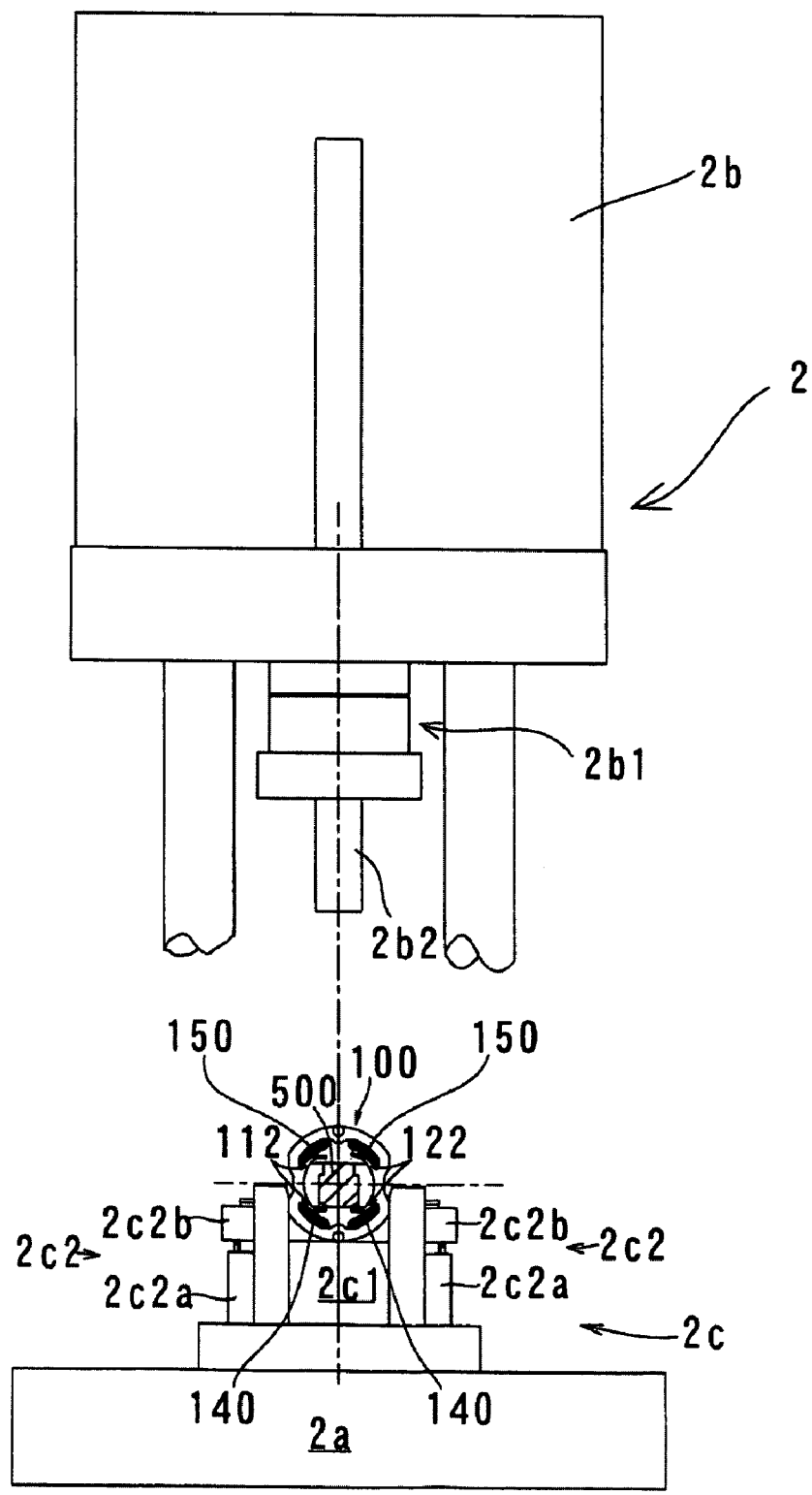
FIG. 23 is a sectional view showing a motor manufacturing device 2 that bends the pole pieces 112, 122 toward the slots 113, 123 (returns them to the initial position).
Figure 24:
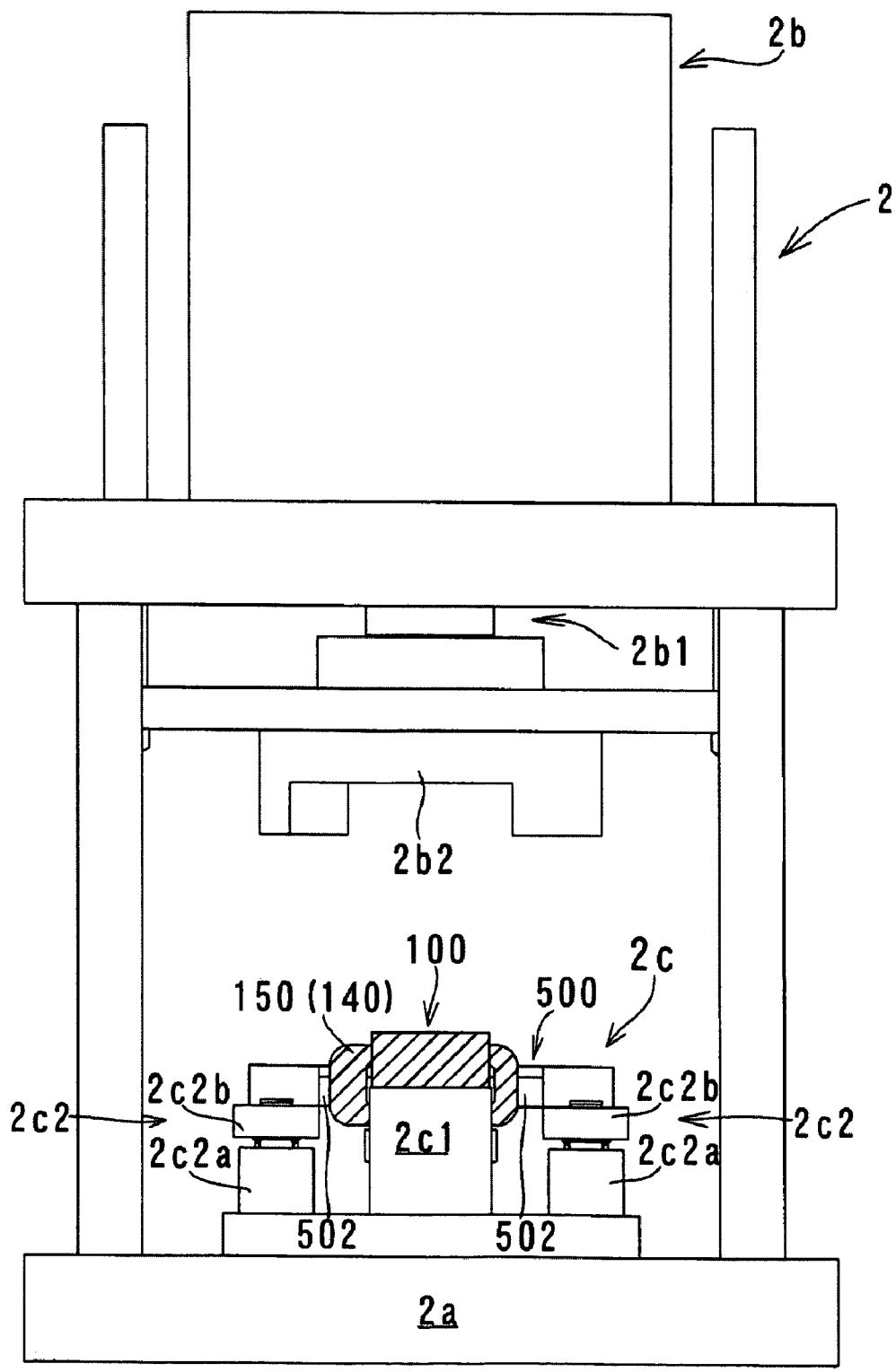
FIG. 24 is a side view showing the motor manufacturing device 2.
Figure 25:
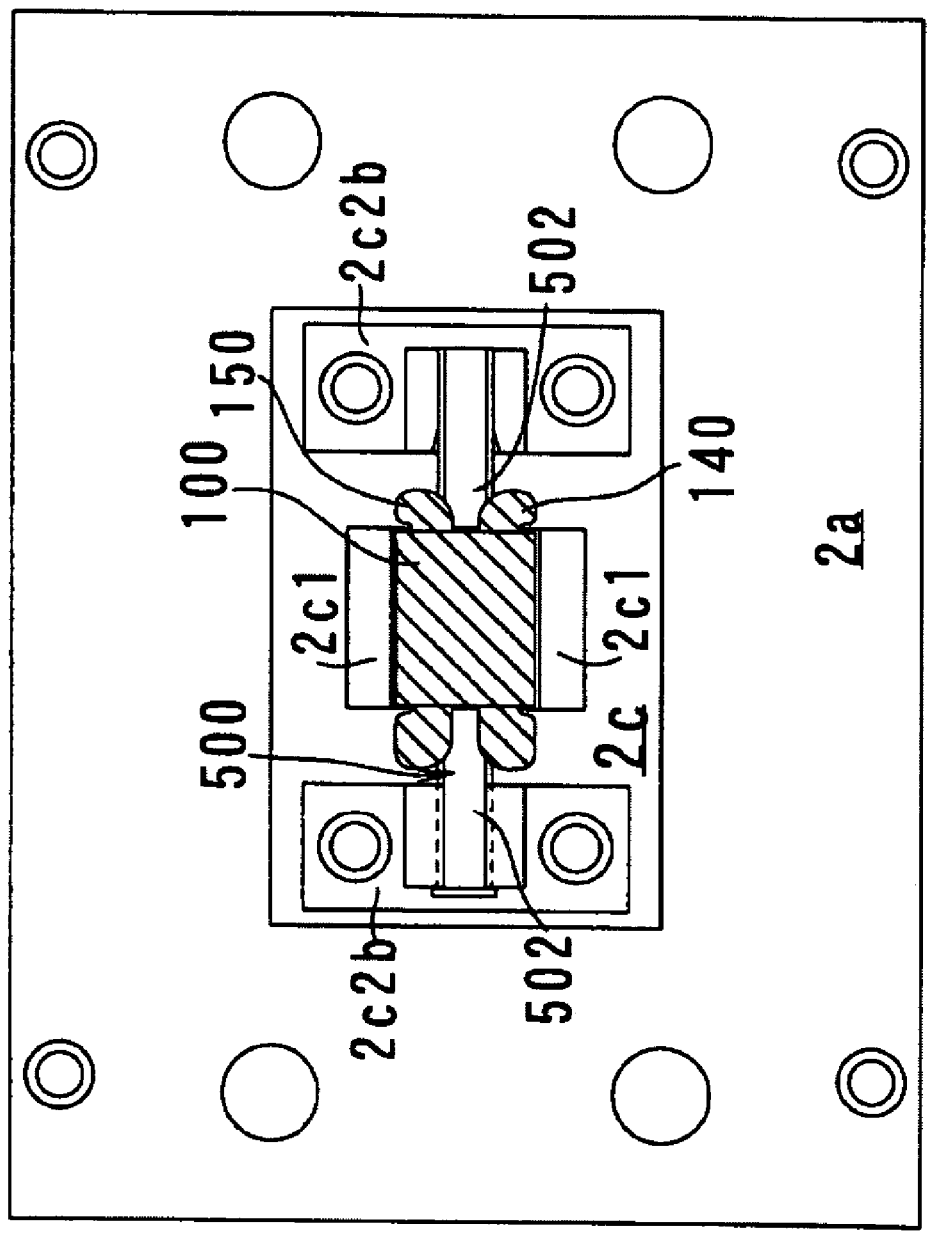
FIG. 25 is a plan view showing the motor manufacturing device 2.

Now, a motor manufacturing device 2 will be explained with reference to FIGS. 23 to 25, which show the motor manufacturing device 2 in sectional view, side view and plan view, respectively. The motor manufacturing device 2 serves to return the pole pieces 112 (112b, 112c), 122 (122b, 122c) to the initial position after the pole pieces 112, 122 are bent away from the slots 113, 123. As shown in FIGS. 23 to 25, the motor manufacturing device 2 includes a base 2a, a pressing device 2b supported by a support such as a column on the base 2a, a fixture 2c mounted on the base 2a, and the jig 500 (see FIG. 9) for bending the pole pieces toward the slots 113, 123.

The pressing device 2b has an air cylinder 2b1 which can slide vertically. A pressing member 2b2 is generally C-shaped in vertical section. The pressing member 2b2 is connected to the end of the air cylinder 2b1 in such an orientation that the opening of the C-shaped pressing member 2b2 faces downward as viewed in FIGS. 23 and 24. The fixture 2c on the base 2a includes a stator fixture 2c1 for retaining the stator core 100 and jig supports 2c2. The jig supports 2c2 are mounted on the both sides of the stator fixture 2c1 and serve to support the both ends of the jig 500 inserted into the stator core 100. Each of the jig supports 2c2 includes abase 2c2a and a jig support part 2c2b. The jig support part 2c2b is mounted on the base 2c2a via an elastic element, such as a spring.

The stator core 100 is fixedly placed on the stator fixture 2c1 such that the longitudinal direction of the stator core 100 coincides with a horizontal direction. Then, the jig 500 is inserted into the hollow part 101 of the stator core 100 while being held in contact with the pole pieces 112, 122. The both end portions 502 of the jig 500 inserted into the stator core 100 protrude from the both open ends of the stator core 100. As shown in FIGS. 24 and 25, the end portions 502 of the jig 500 are placed on the upper surface of the jig support part 2c2b. Then, although not shown, an actuating switch of the pressing device 2b is operated to cause the air cylinder 2b1 to move downward (as viewed in FIGS. 23 and 24) toward the stator core 100. Upon the movement of the air cylinder 2b1, the pressing member 2b2 connected to the end of the air cylinder 2b1 moves downward into contact with the end portions 502 of the jig 500 and presses them downward. When the pressing member 2b2 presses the end portions 502 of the jig 500, the jig support parts 2c2b on which the end portions 502 are placed slightly move downward (as viewed in FIGS. 23 and 24) because the jig support parts 2c2b are mounted on the base 2c2a via the elastic element When the air cylinder 2b1 is further moved downward, the end portions 502 of the jig 500 are pressed downward toward the outer circumference of the stator core 100.

The pole pieces 112, 122 are bent toward the slots 113, 123 and returned to the initial position. As a result the stator core 100 having the coil units 140, 150 as shown in FIG. 13 is obtained by this process.

(Motor Manufacturing Device for Assembling Stator Core Halves)

Figure 26:
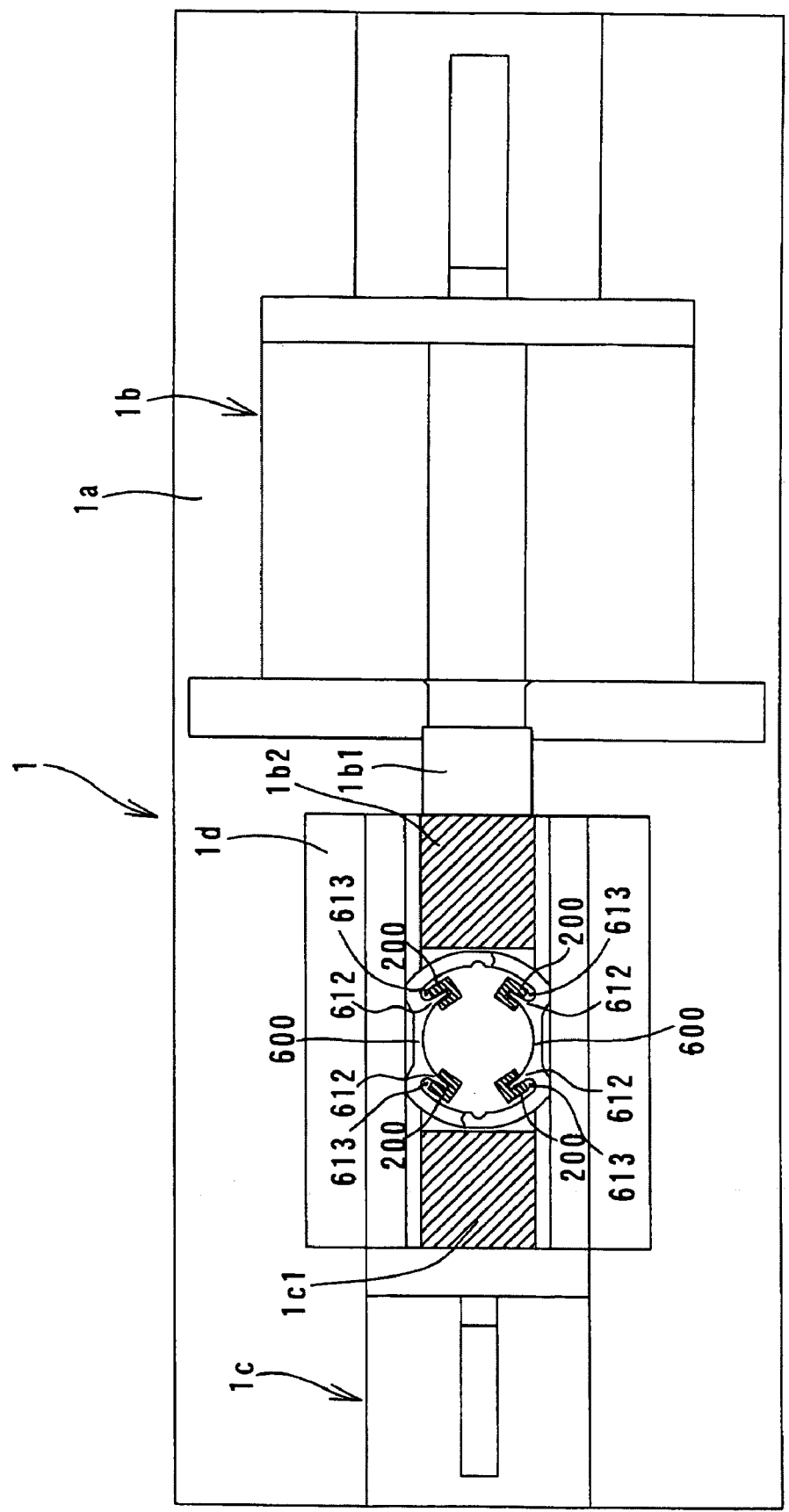
FIG. 26 shows the motor manufacturing device 1 used to bend the pole pieces of the stator core halves 600 away from the slots 613 after the two stator core halves including a laminate of steel sheets are assembled together.

Further, in order to bend the pole pieces 612 of the stator core halves 600 away from the slots 613 as described in the second embodiment, as shown in FIG. 26, the above-mentioned motor manufacturing device 1 can be used (see FIG. 21). Two stator core halves 600 in which the jig 200 shown in FIG. 2 is mounted to each of the pole pieces 612 are prepared. The two stator core halves 600 are oppositely assembled together and placed between the pressing members 1b2, 1c1 such that the longitudinal direction of the stator core halves 600 coincides with a vertical direction. Then, the pressing device 1b is actuated to bend the pole pieces 612 away from the slots 613.

Figure 27:
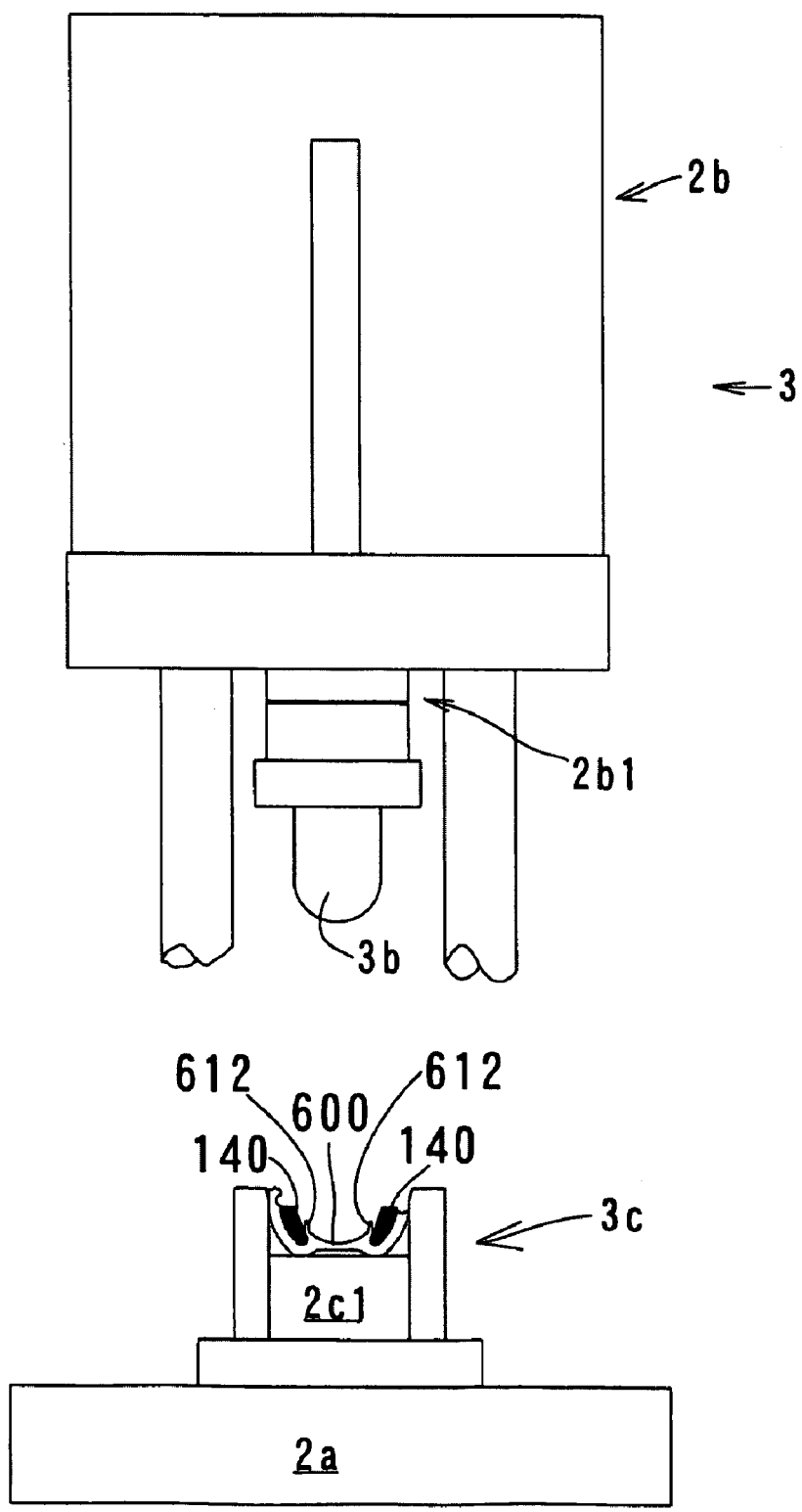
FIG. 27 is a sectional view showing the motor manufacturing device 3 used to bend the pole pieces 612 of the laminated stator core half 600 toward the slots 613 in order to return them to the initial position).
Figure 28:
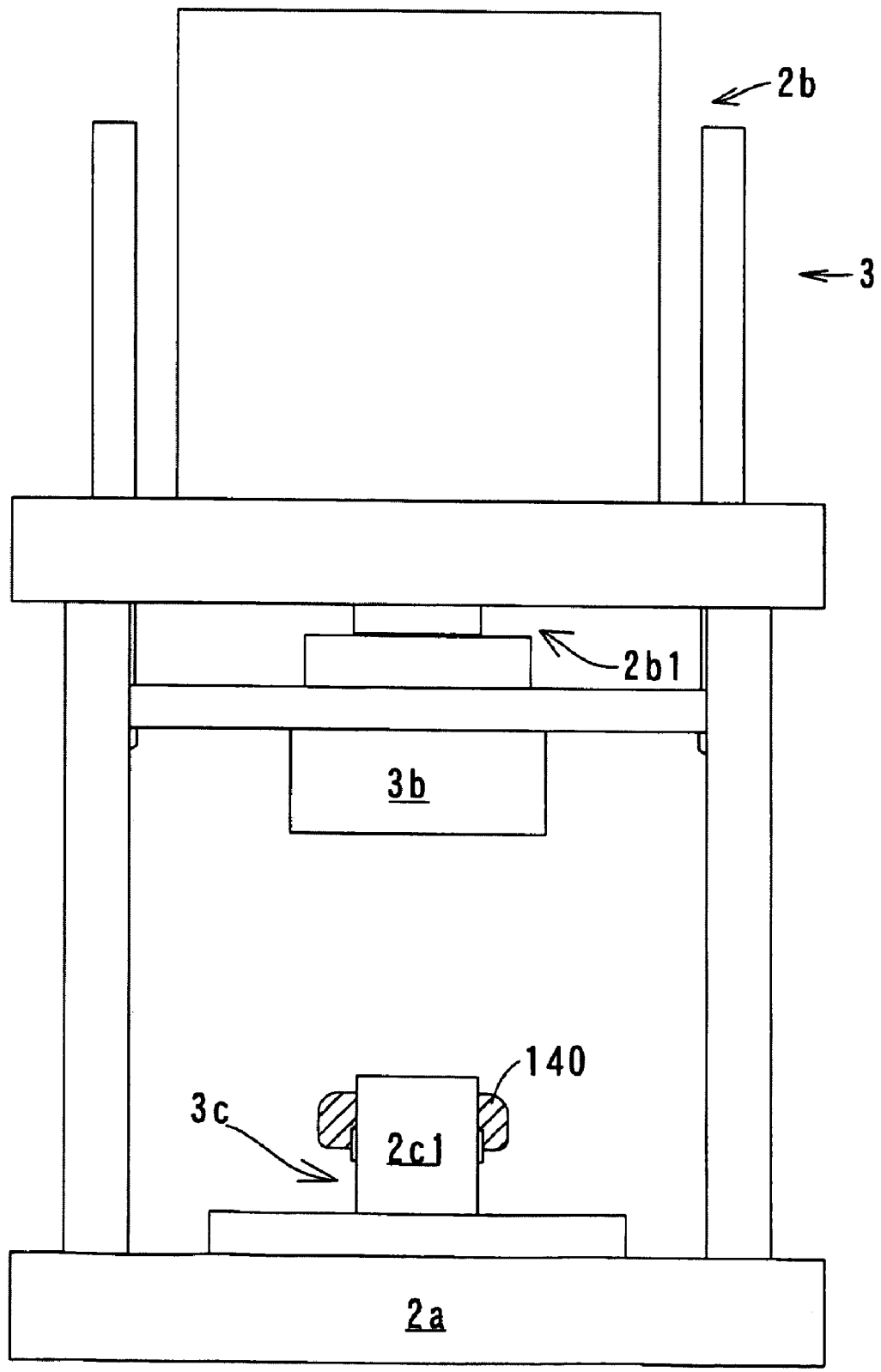
FIG. 28 is a side view showing the motor manufacturing device 3.
Figure 29:
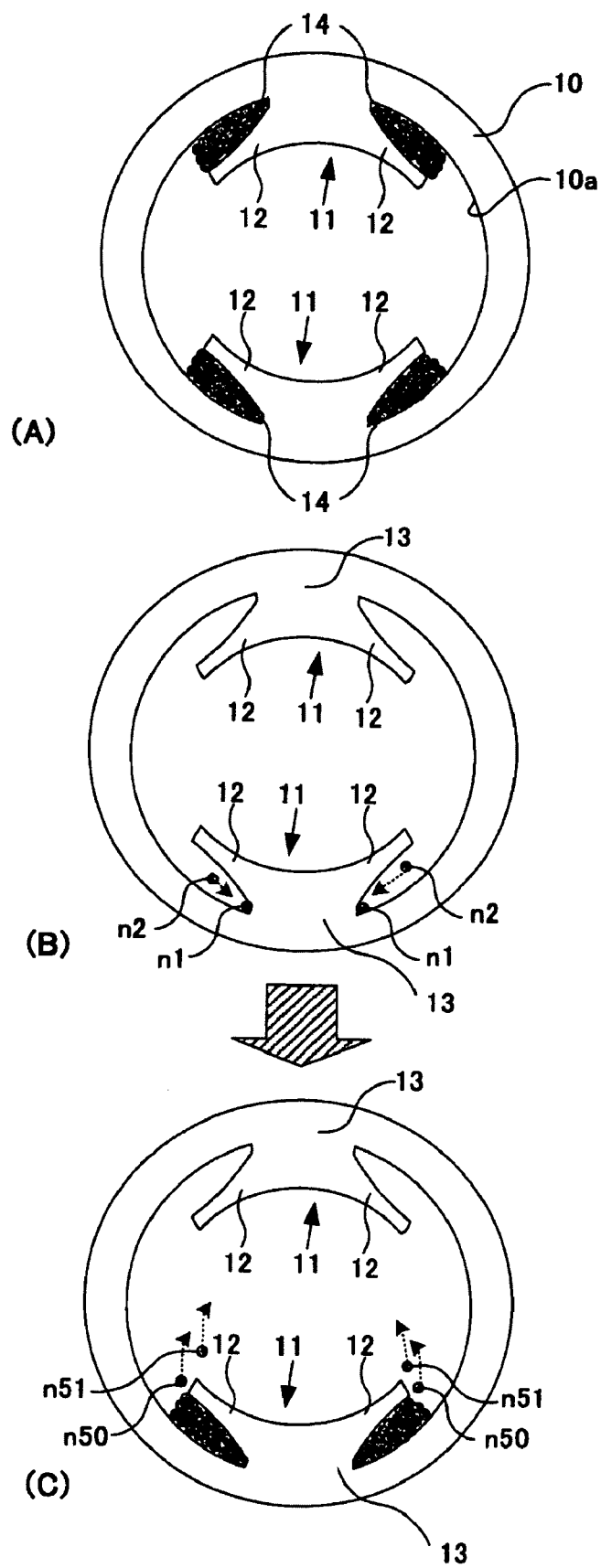
FIGS. 29(A), 29(B) and 29(C) schematically show a prior art

Now, a motor manufacturing device 3 will be explained with reference to FIGS. 27 and 28, which show the motor manufacturing device 3 in sectional view and side view, respectively. The motor manufacturing device 3 serves to return the pole pieces 612 to the initial position after the pole pieces 612 are bent away from the slots 613. As shown in FIG. 27, the motor manufacturing device 3 includes the base 2a, the pressing device 2b that is supported by a support such as a column, on the base 2a, and a fixture 3c mounted on the base 2a. The motor manufacturing device 3 has much the same construction as the motor manufacturing device 2 shown in FIGS. 23 to 25 except that the jig 500 is not provided. Accordingly, the fixture 3c on the base 2a has the stator fixture 2c1 for retaining the stator core 100, but does not have the jig supports 2c2 for supporting the both ends of the jig 500. Further, in the motor manufacturing device 3, a pressing member 3b is mounted on the end of the air cylinder 2b1. The pressing member 3b has the same shape as the jig 700 shown in FIG. 16 (or has an arcuate pressing surface corresponding to the pole pieces 612).

The stator core half 600 with the coil unit 140 is fixedly placed on the stator fixture 2c1 such that the opening of the stator core half 600 faces upward. Then, although not shown, an actuating switch of the pressing device 2b is operated to cause the air cylinder 2b1 to move downward (as viewed in FIGS. 27 and 28) toward the stator core 100. Upon the movement of the air cylinder 2b1, the pressing member 3b mounted on the end of the air cylinder 2b1 moves downward into contact with the end portions 502 of the jig 500 and presses them. The pole pieces 612 are bent toward the slots and returned to the initial position. As a result, the stator core half 600 with the coil unit 140 as shown in FIG. 16 is obtained by this process.

In addition to the description above, the invention can be applied to techniques of manufacturing various kinds of motors having field poles on the inside surface of the stator core. Further, the invention can be applied to techniques of manufacturing a motor having three or more field poles such as an induction motor and a brushless motor.

We claim:

1. A device for manufacturing a motor, the motor including a stator body that includes a stator of the motor, field cores that protrude from the inside surface of the stator body, pole pieces that extend from the field cores to cross with the field cores, coil receiving parts defined by a space facing the field cores, the pole pieces and the inside surface of the stator body, and coils retained in the coil receiving parts, comprising:

first jigs that extend in the longitudinal direction of the stator body and retain the pole pieces, a second jig that extends in the longitudinal direction of the stator body and has a pressing part corresponding to the arcuate shape of the pole pieces and a pressing mechanism that presses the first jigs retaining the pole pieces, away from the coil receiving parts, thereby bending the pole pieces away from the coil receiving parts, so that the tied coils is inserted into the coil receiving parts without interfering with the pole pieces, and also presses the second jig toward the coil receiving parts with the pressing part of the second jig held in contact with the pole pieces bent by the first jigs, thereby bending the pole pieces toward the coil receiving parts into an arcuate shape.

2. The device as defined in claim 1, wherein at least one of the pole pieces is bent a smaller angle away from the associated coil receiving part than the other pole pieces.

3. The device as defined in claim 1 further comprising an air press machine that performs bending operation of first and second jigs.

* * * * *